United States Patent
Muroi et al.

[11] Patent Number: 6,033,130
[45] Date of Patent: Mar. 7, 2000

[54] LENS COVER AND A LENS COVER SUPPORT ASSEMBLY MOUNTED EXTERNAL TO A LENS BARREL

[75] Inventors: Takashi Muroi, Higashiyamato; Yuji Kobayashi, Hachioji; Katsumi Motohashi, Hoya; Sumio Kawai, Hachioji; Yuji Imai, Higashiyamato; Yasuo Asakura, Hachioji; Tatsuya Suzuki, Tokyo, all of Japan

[73] Assignee: Olympus Optical Co., Ltd., Tokyo, Japan

[21] Appl. No.: 09/178,708

[22] Filed: Oct. 26, 1998

[30] Foreign Application Priority Data

| Oct. 27, 1997 | [JP] | Japan | 9-294374 |
| Nov. 5, 1997 | [JP] | Japan | 9-302991 |
| Dec. 8, 1997 | [JP] | Japan | 9-337243 |
| Dec. 18, 1997 | [JP] | Japan | 9-349620 |

[51] Int. Cl.[7] .................................................. G03B 17/04
[52] U.S. Cl. ............................................. 396/448; 396/535
[58] Field of Search ..................... 396/348, 349, 396/439, 448, 535

[56] References Cited

U.S. PATENT DOCUMENTS

| 4,500,184 | 2/1985 | Morizumi et al. | 396/177 |
| 5,602,607 | 2/1997 | Kato et al. | 396/349 |

FOREIGN PATENT DOCUMENTS

| 63-26832 U | 2/1963 | Japan . |
| 54-3931 U | 11/1979 | Japan . |
| 57-116933 U | 7/1982 | Japan . |
| 61-31308 U | 9/1986 | Japan . |
| 3-47536 U | 5/1991 | Japan . |
| 9-113959 | 5/1997 | Japan . |

*Primary Examiner*—Safet Metjahic
*Assistant Examiner*—J. K. Han
*Attorney, Agent, or Firm*—Louis Weinstein

[57] ABSTRACT

A lens cover mounted camera with a lens cover movable to selectively assume at least a closing condition that covers a front surface of a photographing lens and an opening condition that exposes the front surface of the photographing lens, and further having a lens cover operating member for conducting the opening and closing operations of the lens cover and further for shifting the lens cover in directions of the optical axis of the photographing lens. When the camera is switched to a using condition or a non-using condition, the lens cover is respectively shifted to an opening position or a closing position through the lens cover operating member. This design minimizes the protruding quantity of the lens cover from a camera body and prevents the lens cover from being easily broken even if a careless external force or shock works on the lens cover during the use of the camera.

35 Claims, 17 Drawing Sheets

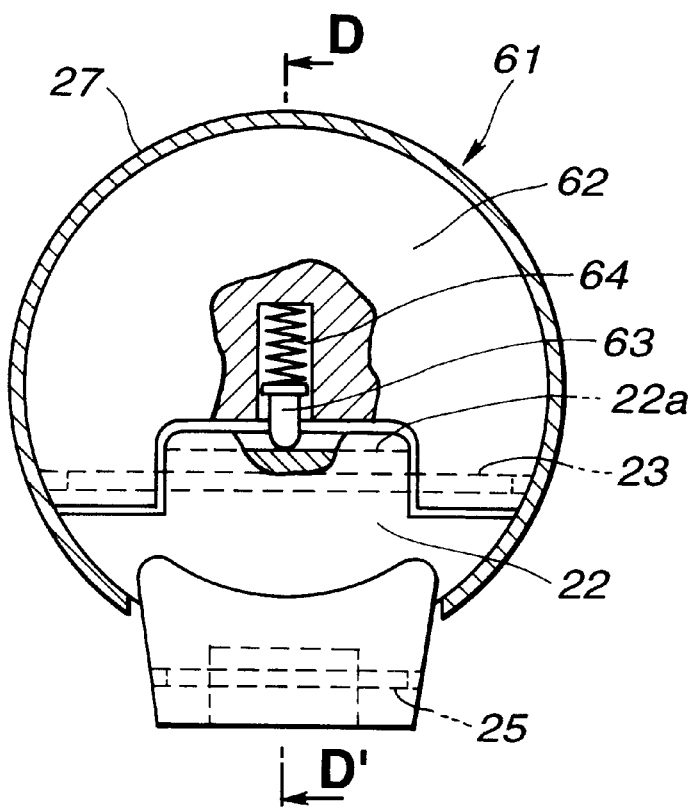
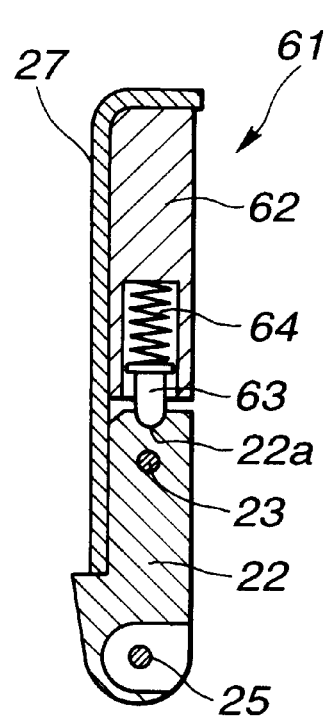
FIG.18A
FIG.18B

LENS COVER AND A LENS COVER SUPPORT ASSEMBLY MOUNTED EXTERNAL TO A LENS BARREL

BACKGROUND OF THE INVENTION

1. Field of the Invention

The present invention relates to a camera with a lens cover, and more particularly to a camera equipped with a lens cover which covers a front surface of a photographing lens for the purpose of the protection of the photographing lens, with the lens cover having an openable and closable construction.

2. Related Art Statement

So far, as photographing cameras, there have been proposed various types of cameras each of which features an openable and closable member for protecting a front surface of a photographing lens barrel mounted on a camera body, so-called camera with a lens cover, which has been put into practical use.

For instance, Japanese Examined Utility Model Publication No. 61-31308 discloses a camera with a double-leafed hinged lens cover. This camera is equipped with a lens cover which is rotatably mounted on the front surface side of a camera body, and the lens cover brings the front surface of a photographing lens barrel into a flat closed condition when the photographing lens barrel, storable and protrusible with respect to the camera body, is stored in the camera body while causing the front surface of the photographing lens barrel to appear when the photographing lens barrel goes into a protruding condition.

There is a problem which arises with the means disclosed in Japanese Examined Utility Model Publication No. 61-31308, however, in that the employment of the double-leafed hinged lens cover causes the lens cover to largely project at opposite side portions of the photographing lens barrel when the camera is placed into a photographing condition. That is, if, in this state, a careless external force or shock is applied onto the lens cover itself, this lens cover readily breaks down.

Furthermore, Japanese Unexamined Utility Model Publication No. 54-3931 discloses a camera comprising a photographing lens barrel mounted on a camera body to be movable in directions of its optical axis so that it retracts into the camera body in a non-photographing condition while protruding from the camera body in a photographing condition, and further comprising an overturnable lens cover supported by the camera body to be rotatable around a shaft. In addition, in this camera, in conjunction with the closing motion of the lens cover, the photographing lens barrel is designed to turn from its retracting condition to the photographing condition and to protrude, so that the front surface of the photographing lens barrel appears and the lens cover sits on a lower portion side of the photographing lens barrel.

However, in the case of the camera disclosed in Japanese Unexamined Utility Model Publication No. 54-3931, since the lens cover greatly protruding toward the lower portion side of the photographing lens barrel in its closing condition links with the operation of the photographing lens barrel, a complicated mechanism becomes necessary and an arm member also serving as a reinforcing member for the lens cover becomes necessary. For this reason, a problem occurs in that there is a need to form a given space which accommodates components for a lens cover opening and closing mechanism comprising the aforesaid arm member and others.

Still further, Japanese Unexamined Utility Model Publication No. 3-47536 discloses a camera having a construction to support a lens cover through shafts at both sides of a lens barrel on a camera body. This camera is made such that the lens cover is opened by barrel front end portions in a double-leafed hinged condition when the lens barrel varies from the retracted condition to the photographing condition and protrudes, with the result that the front surface of the lens barrel appears.

However, in the case of the aforesaid construction disclosed in Japanese Unexamined Utility Model Publication No. 3-47536, the lens cover is constantly biased by a spring in its closing direction and is rotated by the protrusion of the lens barrel against the spring biasing force in the double-leafed hinged condition to cause the exposure of the front surface of the lens barrel. In this mechanism, in the photographing condition, an extra load resulting from the spring biasing force in the closing-direction of the lens cover works on the lens barrel, with the result that there is a possibility of deteriorating the photography accuracy.

Still further, Japanese Unexamined Patent Publication No. 9-113959 discloses a camera having a structure in which a lens cover is rotatable around a shaft disposed in parallel with a plane perpendicular to the optical axis of a photographing lens, and when a lens barrel turns from its retracted condition to its photographing condition and protrudes, a front end portion of the lens barrel presses the lens cover to rotationally drive it in its opening direction so that the front surface of the lens barrel appears.

However, in the case of the camera disclosed in Japanese Unexamined Patent Publication No. 9-113959, in response to the turning-on of a power supply, the lens barrel protrudes from the retracted position to press the lens cover located at the front surface of the lens barrel so that the lens cover rotates in its opening direction. This rotating movement exposes the front surface of the lens barrel so that the camera comes into a photographing condition. On the other hand, for bringing the camera into a non-photographing condition, a power switch is turned off to retract the lens barrel and subsequently the lens cover is closed by a hand. That is, it is necessary to take troublesome double action.

Moreover, Japanese Unexamined Utility Model Publication No. 57-116933 discloses a front cover opening and closing device acting as a lens cover for a camera, which is made to rotate around a shaft positioned on a lower end side of a camera body to retreat from the front surface of a photographing lens.

However, the entire camera lens cover disclosed in Japanese Unexamined Utility Model Publication No. 57-116933 is constructed as a rigid body, and hence, if a careless force or impact works on the lens cover, the lens cover itself can be broken down. For this reason, there is a need to install a mechanism to automatically separate the lens cover before the breakdown for the purpose of preventing the breakdown. However, in the case that the mechanism for separating the lens cover without breakdown is built therein, the entire mechanism becomes complicated, and the re-assembling or restoration after the separation becomes needed but is not easy.

Besides, the separating mechanism can be placed in a movable lens frame like a barrier structure exemplified by Japanese Unexamined Utility Model Publication No. 63-26832. In the case of the barrier structure disclosed in Japanese Unexamined Utility Model Publication No. 63-26832, when a filter is mounted on a photographing lens, difficulty is encountered to close the barrier, and hence, difficulty is experienced to use the barrier in a state of mounting the filter. If an interval corresponding to the thickness of the filter is initially defined between the lens and the barrier, a problem occurs in that the camera increases in size. Thus, a structure in which the filter is located outside the barrier is employed unavoidably.

In addition, the camera proposed in U.S. patent application Ser. No. 09/050,399 (Filed Date: Mar. 30, 1998) by this Applicant is provided with another mechanism coping with the lens filter mounting condition.

However, in the camera in U.S. patent application Ser. No. 09/050,399, it is necessary that a barrier moving mechanism be additionally placed for mounting a filter, and therefore, the mechanism becomes complex and the number of parts increases to cause a higher cost.

SUMMARY OF THE INVENTION

Accordingly, the present invention has been developed with a view to eliminating the above-mentioned problems, and it is a first object of this invention to provide a camera with an overturnable lens cover which can reduce the protruding quantity of a lens cover protruding from a camera body to a minimum with a simpler structure.

A second object of this invention is to provide a lens cover opening and closing mechanism for protecting a front surface of a photographing lens, and to provide a camera with a lens cover equipped with a lens cover mechanism which can easily open and close the lens cover while preventing an extra force from working on a lens barrel section in a photographing condition and in which the changing-over of a switch is possible at this time.

A third object of this invention is to provide a lens barrel with a lens cover which is not broken down due to a careless operation or shock and which is easily restorable to the original condition.

A fourth object of this invention is to provide a camera with a lens cover which is closable even if a lens filter or the like is mounted on a lens barrel frame, and which does not require additional parts so that the increase in cost is suppressible.

A lens cover mounted camera according to a first aspect of this invention comprises a lens cover selectively taking at least a closing condition to cover a front surface of a photographing lens and an opening condition to expose the front surface of the photographing lens, and a slide mechanism for movably supporting the lens cover in the directions of an optical axis of the photographing lens in a state where the lens cover is in the opening condition.

In this lens cover mounted camera according to the first aspect of this invention, the lens cover supported by the slide mechanism can be shifted from a closing position to an opening position so that the photographing lens appears to permit a photographing operation.

A lens cover mounted camera according to a second aspect of this invention comprises a lens cover rotatably supported by a supporting shaft placed in parallel with a plane substantially perpendicular to an optical axis of a photographing lens so that the lens cover selectively takes, by its rotation, at least a closing condition to cover a front surface of the photographing lens and an opening condition to expose the front surface of the photographing lens, a lens cover opening member made to hold the supporting shaft and to selectively move the supporting shaft in a first direction and a second direction opposite to the first direction along directions substantially parallel with the optical axis of the photographing lens, and a switch member made to operate in connection with the movement of the lens cover operating member.

In the lens cover mounted camera according to the second aspect, the lens cover moves from the closing position to the opening position in a manner that the supporting shaft is shifted by the lens cover operating member in the first direction, and further moves from the opening position to the closing position in a manner that the supporting shaft is shifted by the lens cover operating member in the second direction. Simultaneously, the switch member is operated with the movement of the lens cover operating member.

A lens cover mounted camera according to a third aspect of this invention comprises a supporting shaft placed in parallel with a plane substantially perpendicular to an optical axis of a photographing lens, and a lens cover supported by the supporting shaft to be rotatable at least between a closing position that covers a front surface of the photographing lens and an opening position that makes the front surface thereof appear, and when a force is applied to the lens cover in a direction of further opening the lens cover while the lens cover is at the opening position, the lens cover is divided into at least two sections along a line parallel with the supporting shaft.

A lens cover mounted camera according to a fourth aspect of this invention comprises a supporting shaft placed in the vicinity of an outer circumferential surface of a photographing lens barrel to extend in a substantially tangential line to the outer circumferential surface, a lens cover supported by the supporting shaft to be rotatable and movable around the supporting shaft to selectively move at least between a closing position that covers a front surface of the photographing lens barrel and an opening position that makes the front surface of the photographing lens barrel appear, a supporting member for supporting the supporting shaft to allow the supporting shaft to be movable along directions of an optical axis of a photographing lens, and holding means for holding the movably supported supporting member at each of a plurality of positions in the optical axis directions.

In the lens cover mounted camera according to the fourth aspect, the lens cover is pivotally supported by the supporting shaft supported by the supporting member, and the supporting member is held at the plurality of positions so that the lens cover is also shifted to the corresponding position, for example, the opening position and the closing position.

BRIEF DESCRIPTION OF THE DRAWINGS

FIG. 18A is a front elevational view showing a lens cover section closing condition with respect to a barrel of a camera with a lens cover according to a seventh embodiment of this invention;

FIG. 18B is a cross-sectional view taken along a line 18B–18B' of FIG. 18A;

DETAILED DESCRIPTION OF THE PREFERRED EMBODIMENTS

The present invention will be described hereinbelow through embodiments illustrated.

Figure 1:
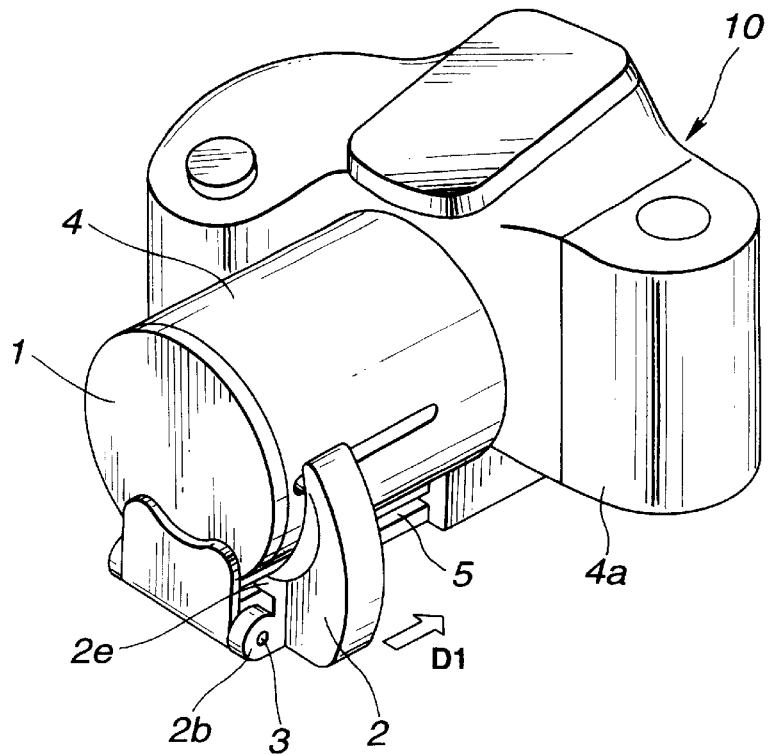
FIG. 1 is a perspective view schematically showing a non-photographing condition of a camera with a lens cover according to a first embodiment of the present invention, where the lens cover is in a closing condition (closing position)
Figure 2:
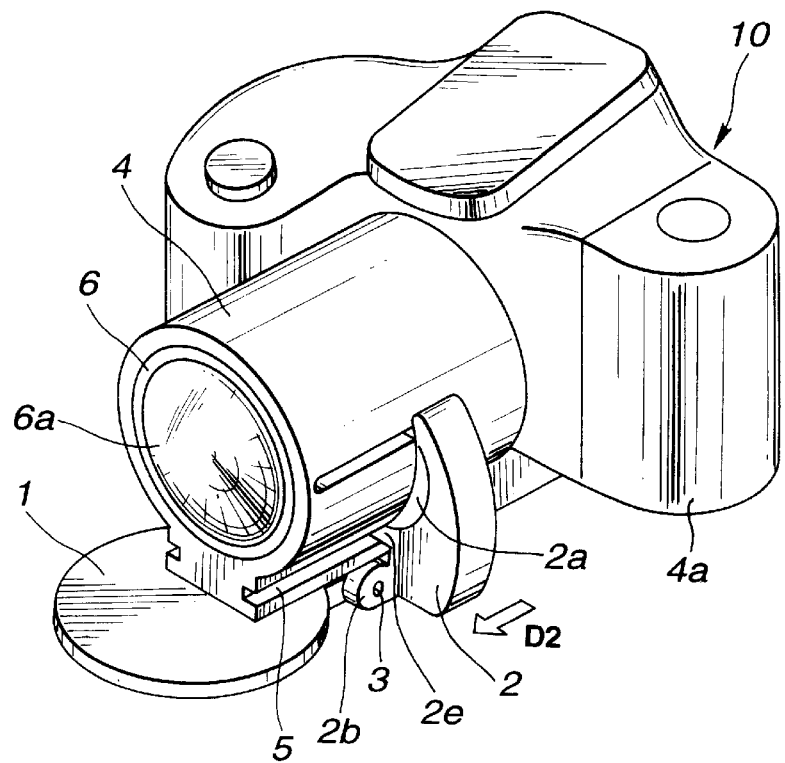
FIG. 2 is a perspective view schematically showing a photographing condition of the FIG. 1 camera, where the lens cover is in an opening condition (opening position)
Figure 3:
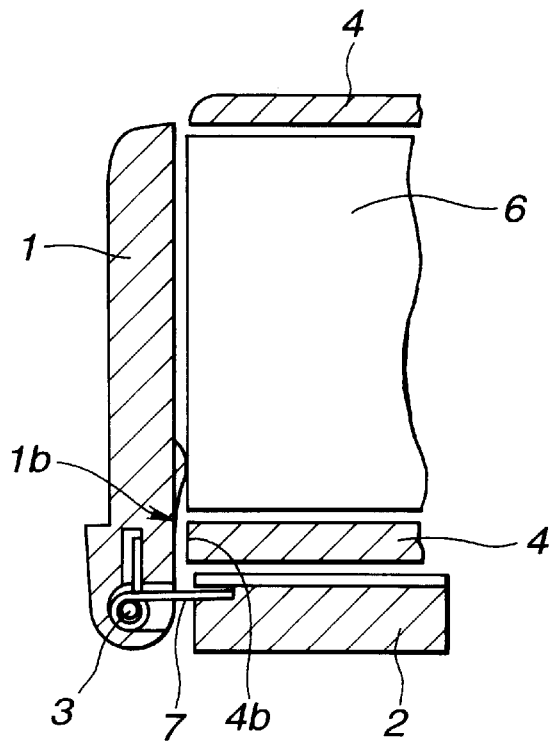
FIG. 3 is an enlarged vertical cross-sectional view showing principal sections of the vicinity of a photographing lens barrel tip portion and the lens cover when the FIG. 1 camera is in the non-photographing condition.
Figure 4:
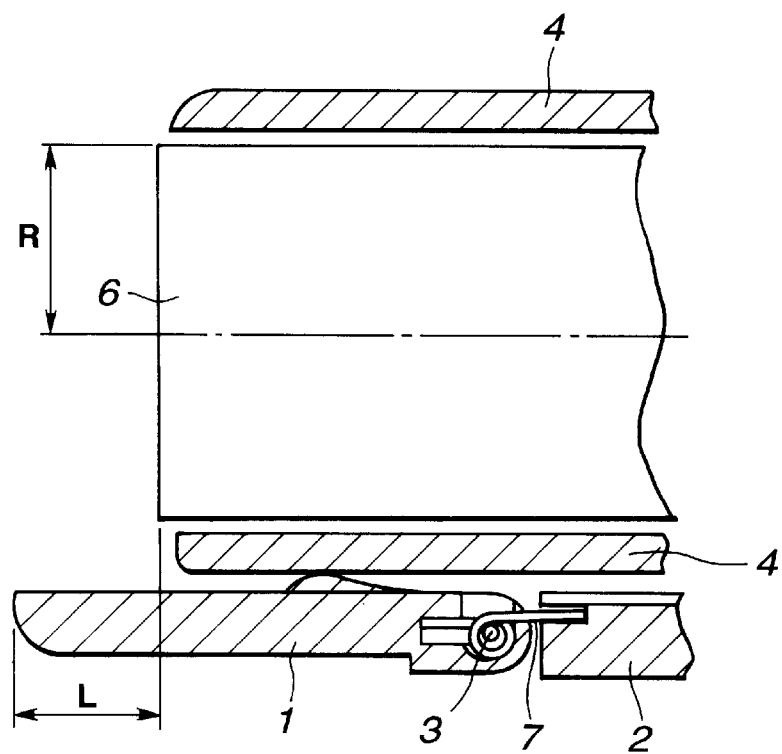
FIG. 4 is an enlarged vertical cross-sectional view showing principal sections of the vicinity of a photographing lens barrel tip portion and the lens cover when the FIG. 1 camera is in the photographing condition.

FIGS. 1 and 2 are perspective views schematically showing a construction of a camera with a lens cover (which will sometimes be referred to as a lens cover mounted camera) according to a first embodiment of this invention. FIG. 1 shows a non-photographing condition in which the lens cover is in a closing condition (closing position) while FIG. 2 shows a photographing condition in which the lens cover is in an opening condition (opening position). Further, FIGS. 3 and 4 are enlarged vertical cross-sectional views showing principal sections of the vicinity of a photographing lens barrel tip portion and the lens cover in the aforesaid camera. FIG. 3 shows a non-photographing condition corresponding to the FIG. 1 condition while FIG. 4 shows a photographing condition corresponding to the FIG. 2 condition.

In the camera, designated at numeral 10, according to this embodiment, a photographing lens barrel 4 is placed at a substantially central portion of a front surface of a front cover 4a forming a front side armoring member. In the interior of this photographing lens barrel 4, a lens holding frame 6 for holding a photographing lens 6a is located to be protrudable and retractable.

As shown in FIGS. 1 and 2, cover opening and closing grooves 5 are made in both side surfaces of a pedestal protrusively installed on a lower surface side of a circumferential section of the photographing lens barrel 4 along the direction of the optical axis of the photographing lens 6a. Projecting portions 2e of a cover operating member 2 for driving a lens cover 1 to open and close a front surface of the photographing lens 6a are fitted in and supported by the cover opening and closing grooves 5 to be slidable in the directions of the optical axis of the photographing lens 6a, which constitutes a slide mechanism whereby the lens cover 1 is movable in the optical axis directions of the photographing lens 6a while the lens cover 1 is in an opening condition and which further constitutes a supporting mechanism for supporting the cover operating member 2 in a fitted-in condition to allow the cover operating member 2 to be movable in the optical axis directions.

In addition, at a front end portion of the cover operating member 2 there is placed the lens cover 1 for opening and closing the front surface of the photographing lens 6a. This lens cover 1 is rotatably supported by a supporting shaft 3 inserted into a through-hole bored in a supporting section 2b situated at a front end portion of the cover operating member 2 to be held thereby. This supporting shaft 3 is installed to be in parallel with a plane substantially perpendicular to the optical axis of the photographing lens 6a, and the lens cover 1 whose proximal portion is pivotally attached thereto is constructed as so-called overturnable lens cover which rotationally shifts to a closing position (see FIG. 1) at which the lens cover 1 covers the front surface of the photographing lens 6a and to an opening position (see FIG. 2) at which the front surface of the photographing lens 6a appears.

That is, the aforesaid cover operating member 2 is for opening and closing the front surface of the photographing lens 6a by the rotating the lens cover 1 and further for moving the supporting shaft 3 in the directions of the optical axis of the photographing lens 6a. More specifically, the cover operating member 2 holds the supporting shaft 3 and selectively shifts the supporting shaft 3 in a first direction (direction indicated by an arrow D1 in FIG. 1) along the optical axis direction of the photographing lens 6a and in a second direction (direction indicated by an arrow D2 in FIG. 2) opposite to the first direction.

Furthermore, as shown in FIGS. 3 and 4, a torsion spring 7 forming a biasing member is wound around the supporting shaft 3 so that the lens cover 1 is constantly biased by this spring 7 in a direction of closing the front surface of the photographing lens 6a.

A description will be made hereinbelow of an operation of the lens cover 1 of the camera 10 thus constructed.

First, when the lens cover 1 of the camera 10 is at the closing position shown in FIG. 1, the user of the camera 10 puts his finger or the like on an operating section 2a of the cover operating member 2 to slide the cover operating member 2 in the arrow D1 direction (first direction) in FIG. 1 along the direction of the optical axis of the photographing lens 6a. Whereupon, the cover operating member 2 is shifted in the same direction in a state of being guided by the cover opening and closing grooves 5 of the photographing lens barrel 4. At this time, a contacting portion 1b (see FIG. 3) of the lens cover 1 with the photographing lens barrel 4 is pressed forwardly by a front end portion 4b (see FIG. 3) of the photographing lens barrel 4. Thus, the lens cover 1 rotationally falls forward around the supporting shaft 3 so that the front surface of the photographing lens 6a comes into view. At this time, the lens cover 1 is disposed in parallel with the optical axis of the photographing lens 6a as shown in FIG. 4. In this state, when the aforesaid cover operating member 2 is further slided in the arrow D1 direction, the lens cover 1 is drawn toward the bottom surface side of the photographing lens barrel 4 (see FIGS. 2 and 4).

Furthermore, the contacting portion 1b of the lens cover 1 receives the biasing force of the torsion spring 7 to be brought into contact with the outer circumferential surface of the photographing lens barrel 4 so that the lens cover 1 is maintained in the fully open condition. At this time, the lens cover 1 assumes a state of protruding forwardly from the tip portion of the photographing lens barrel 4 as shown in FIG. 4. The relationship between the protruding quantity L of the lens cover 1 and the radius R of the photographing lens barrel 4 is R>L.

When the camera 10 assumes the condition shown in FIG. 4, that is, when it comes into a photographing (photographing allowable) condition, the aforesaid lens holding frame 6 takes a slightly protruding condition with respect to the photographing lens barrel 4, and takes a condition movable in the directions of the optical axis of the photographing lens 6a in accordance with the zooming operation, the focusing operation or the like at photographing.

Secondly, in the case that the lens cover 1 is shifted to the closing position at which the lens cover 1 covers the front surface of the photographing lens 6a to assume the non-photographing condition, the cover operating member 2 is slided in the arrow D2 direction (second direction) in FIG. 2 along the direction of the optical axis of the photographing lens 6a. Thereupon, the cover operating member 2 is slided forwardly in a state of being guided by the cover opening and closing grooves 5 of the photographing lens barrel 4 in contrast with the case of its being shifted to the opening position.

In this case, the lens cover 1 is always biased in the closing direction by the biasing force of the torsion spring 7 as mentioned before. Accordingly, when the cover operating member 2 is shifted up to the front end portion of the slidable range, the lens cover 1 receives the restoring force of the torsion spring 7 to go into the closing condition that covers the front surface of the photographing lens 6a.

Meanwhile, when the lens cover 1 is shifted up to the opening position as shown in FIGS. 2 and 4, the camera 10 goes into the photographing condition, and the photographing operation is effected in this condition. When being in this condition, as shown in FIGS. 2 and 4, the lens cover 1 of the camera 10 is in the condition stored on the bottom surface side of the photographing lens barrel 4, while the lens cover 1 opening and closing mechanism and others are exposed to the exterior of the camera body. Further, in this photographing condition, the camera user views the finder image in many cases. Caused by this, there is a possibility that a careless external force acts on the lens cover 1.

Figure 5:
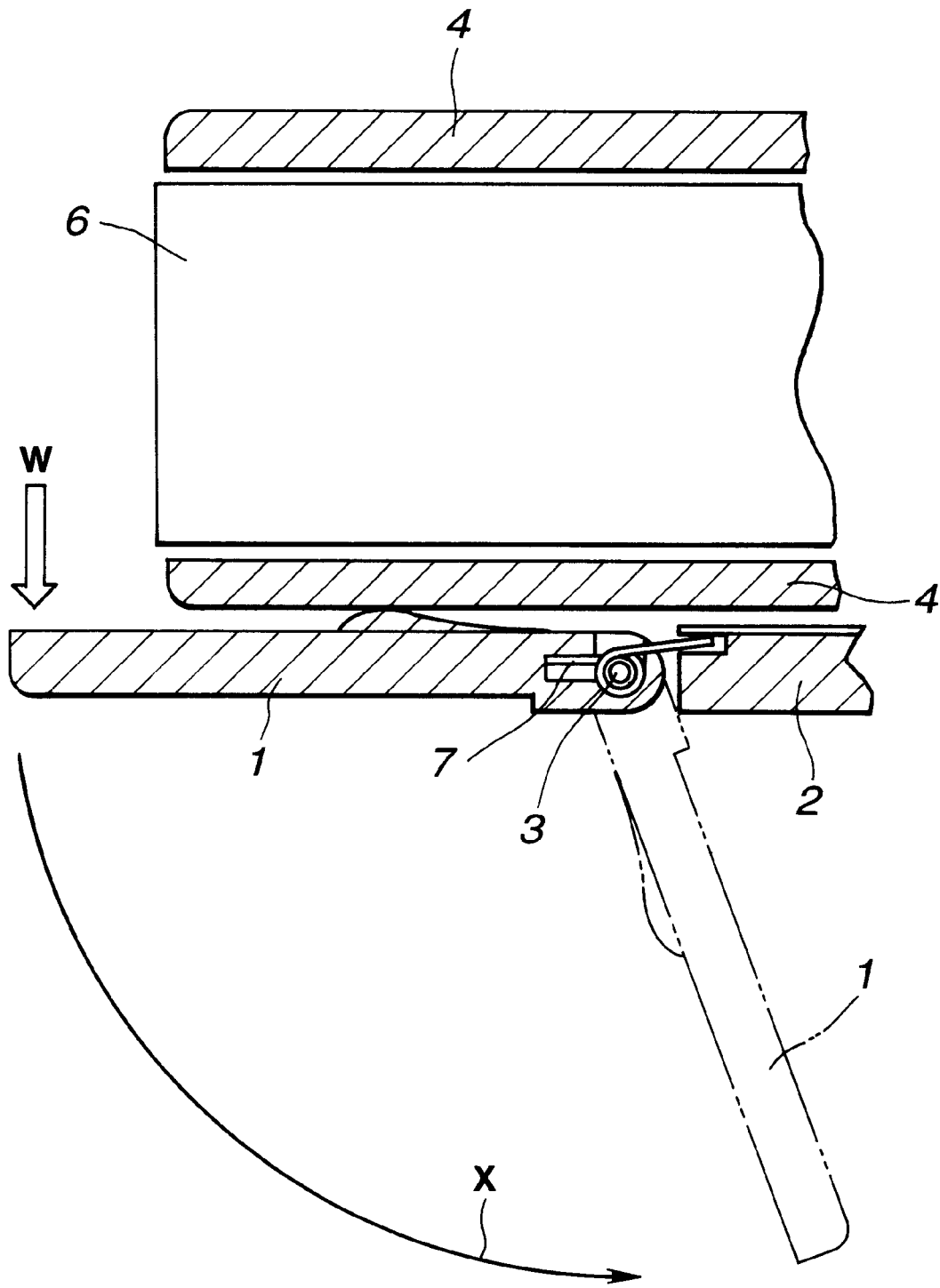
FIG. 5 is a vertical cross-sectional view showing a principal section for describing a state that an external force works on the lens cover in the condition shown in FIG. 4.

For instance, let it be assumed that as shown in FIG. 5 an external force is applied onto a tip portion of the lens cover 1 from an arrow W direction when the lens cover 1 is at the opening position and the camera 10 is in the photographing condition.

Incidentally, in the camera 10 according to this embodiment, the lens cover is rotatable counterclockwise (arrow X direction) around the supporting shaft 3 from the opening position up to a position indicated by a two-dot chain line in FIG. 5 against the biasing force of the torsion spring 7.

Thus, in the case that an external force works from the arrow W direction in FIG. 5, the lens cover 1 rotates in the arrow X direction and, hence, escapes from the effect of the external force. Further, when this external force is removed, the lens cover 1 returns to a position (condition) indicated by a solid line in FIG. 5 in response to the biasing force of the torsion spring 7.

As described above, according to the first embodiment, when the lens cover is set into the opening condition, that is, when the camera 10 is brought into the photographing condition, the lens cover 1 is shifted in the direction of the optical axis of the photographing lens 6 to rotate to fall forwardly and is drawn to the bottom surface side of the photographing lens barrel 4. Accordingly, it is possible to reduce the protruding quantity of the lens cover 1 with respect to the photographing lens barrel 4 with a simpler construction. Whereupon, during the use of the camera 10, the accident such as an external force or shock on the lens lever 1 is reducible.

In addition, since the lens cover 1 is always biased by the torsion spring 7 in the closing direction and the range that the lens cover 1 is rotatable is largely secured, even if an external force or impact is applied to the lens cover 1, it is possible to prevent the lens cover 1 from being easily broken down.

Moreover, since the mechanism for making the lens cover 1 take the opening and closing conditions is constructed simply and this opening and closing mechanism is located at a portion outside the photographing lens barrel 4 and the camera body so as not to interfere with photographing, it is possible to realize the space saving in the interior of the camera without affecting the internal disposition of the camera.

Figure 6:
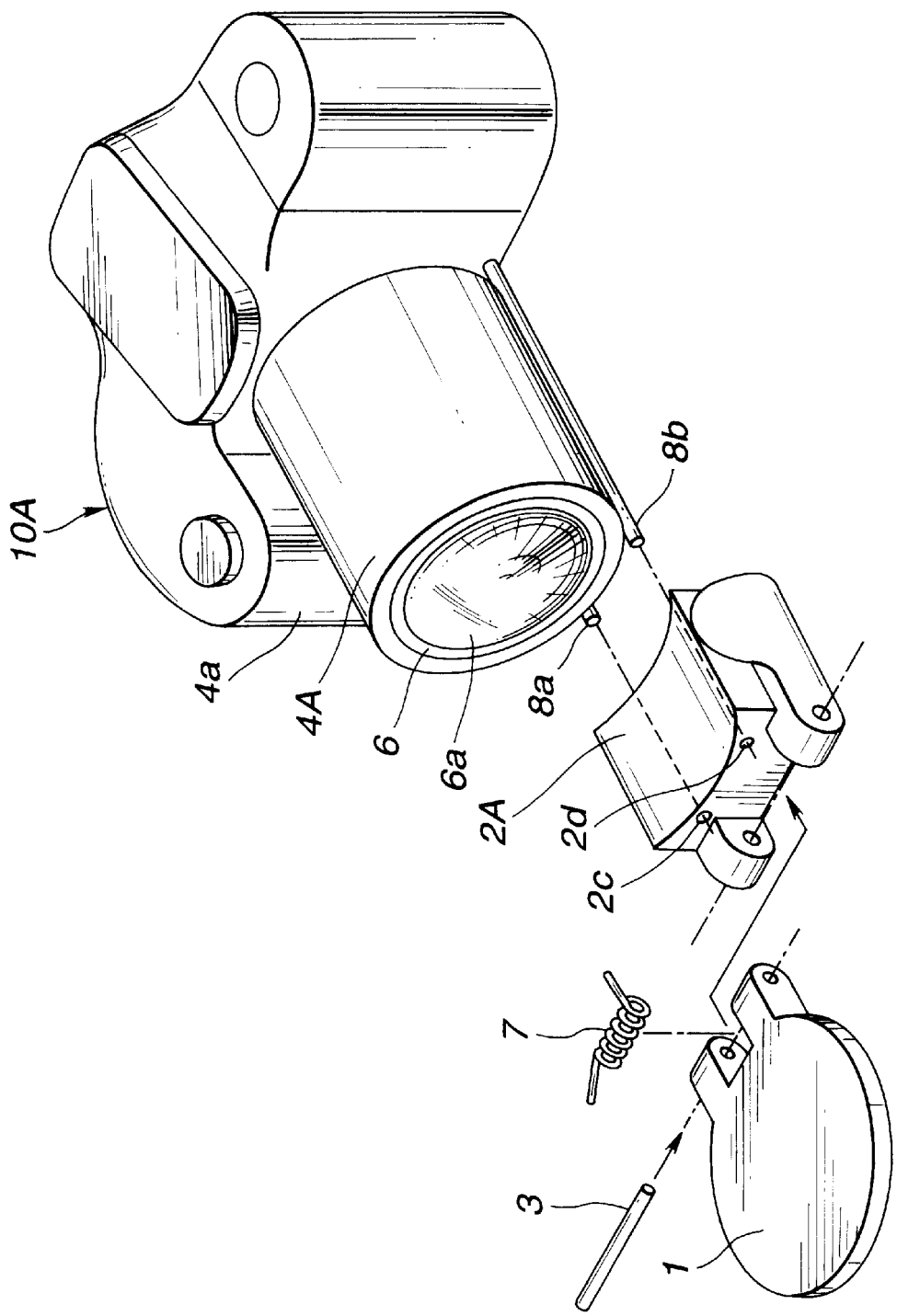
FIG. 6 is an exploded perspective view schematically showing a construction of a camera with a lens cover according to a second embodiment of this invention.

FIG. 6 is an exploded perspective view schematically showing a construction of a camera with a lens cover according to a second embodiment of this invention. The camera according to this embodiment is similar in construction to the above-described first embodiment, and the components corresponding to those of the first embodiment will be marked with the same numerals and the description thereof will be omitted for brevity. The description of this embodiment will be made hereinbelow of only components different therefrom.

In the camera, designated by numeral 10A, according to this embodiment, the cover opening and closing grooves 5 are not made in a photographing lens barrel 4A unlike the above-described first embodiment, but in place of the cover opening and closing grooves 5, cover sliding shafts 8a, 8b serving as shaft sections constituting a supporting mechanism are planted on the bottom side of a front cover 4a to extend in front of the camera in parallel to the optical axis of a photographing lens 6a. The tip portions of these cover sliding shafts 8a, 8b are respectively inserted into through-holes 2c, 2d made in a cover operating member 2A and forming hole sections constituting a supporting mechanism. Thus, the cover operating member 2A is slidable in the directions along the optical axis of the photographing lens 6a on the bottom surface side of the photographing lens barrel 4A.

In addition, like the above-described first embodiment, at the front end portion of the cover operating member 2A, a lens cover 1 is rotatably placed through a supporting shaft 3 located in parallel with a plane substantially normal to the optical axis of the photographing lens 6a. Further, this lens cover 1 is constantly biased by a torsion spring 7 in a closing direction. The other structures and the effects thereof are completely the same as those of the above-described first embodiment.

The above-described second embodiment thus constructed can also offer the same effects as those of the above-described first embodiment. In addition, since the opening and closing mechanism for making the aforesaid lens cover 1 come into the opening and closing conditions can be set in a manner that the cover sliding shafts 8a, 8b for supporting the cover operating member 2A to allow it to be slidable are only planted in the front surface side armoring member of the camera, this embodiment is also applicable simply to the existing cameras at a lower cost.

In the lens cover mounted cameras according to the above-described first and second embodiments, that is, in the cameras having an overturnable lens cover, the protruding quantity of the lens cover protruding from the camera body is suppressible to a minimum with a simpler construction. Further, since there is no need to make a space within the camera body or the photographing lens barrel to store the lens cover opening and closing mechanism, it is possible to provide a lens cover mounted camera which realizes space-saving. Still further, even if a careless external force, impact or the like acts on the lens cover during the use of the camera, easy damages of the lens cover is avoidable.

Figure 7:
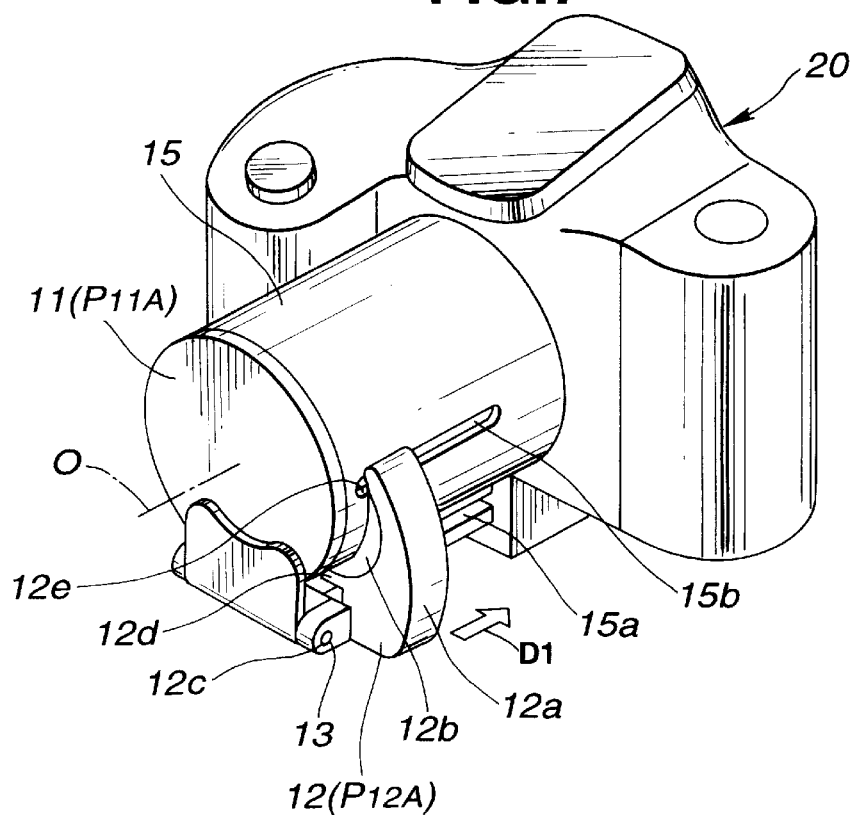
FIG. 7 is a perspective view showing an appearance of a camera with a lens cover according to a third embodiment of this invention, where the lens cover is in a closing condition.
Figure 8:
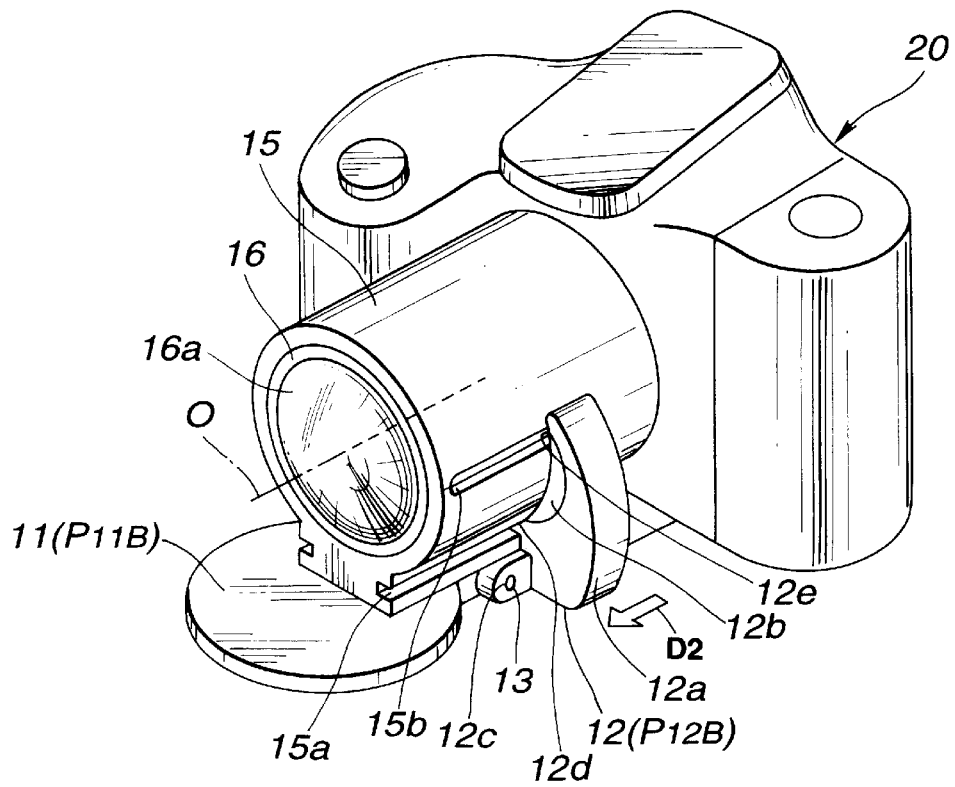
FIG. 8 is a perspective view showing the appearance of the camera with the lens cover according to the third embodiment of this invention, where the lens cover is in an opening condition.
Figure 9:
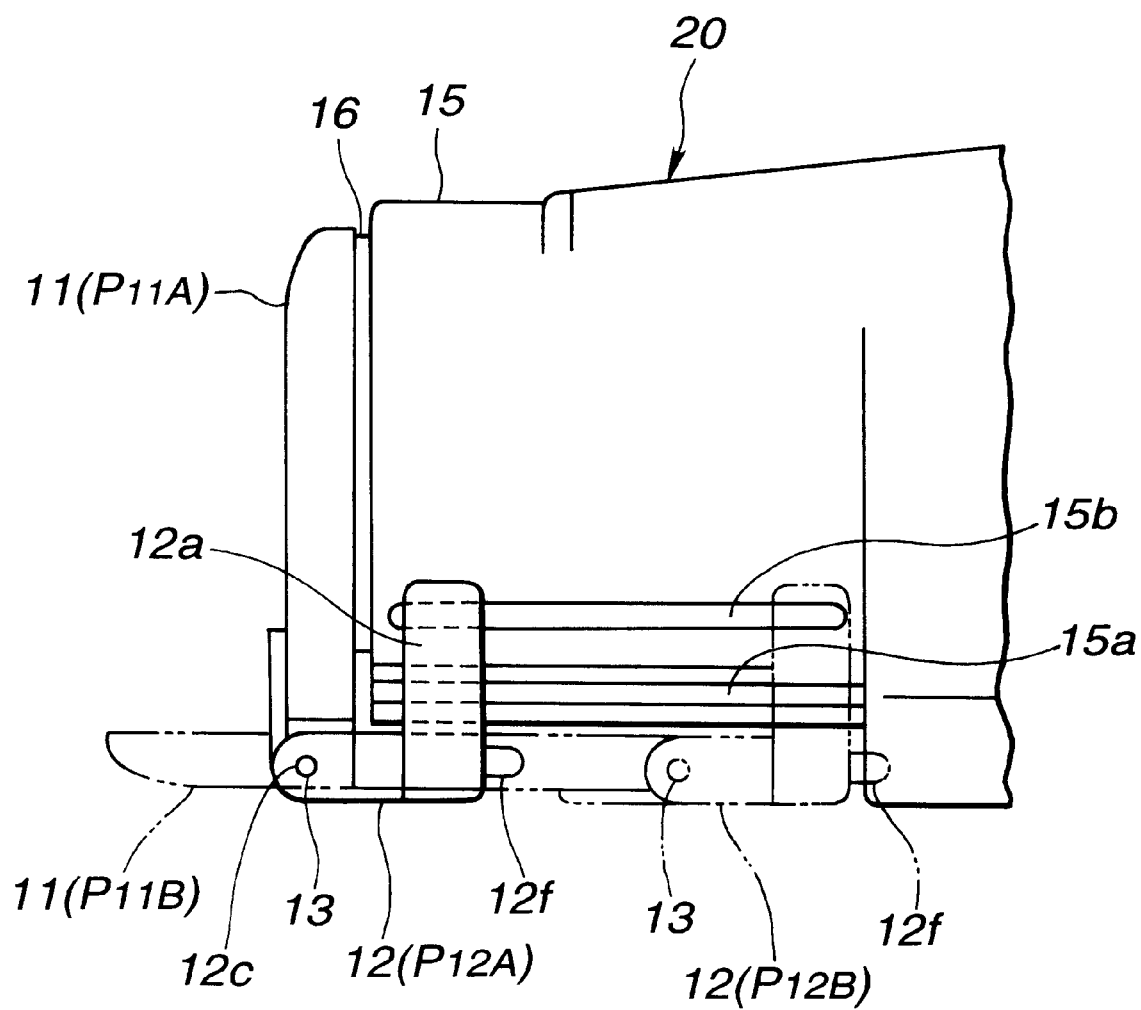
FIG. 9 is a side elevational view showing a periphery of a lens barrel section of the FIG. 7 lens cover mounted camera.
Figure 10:
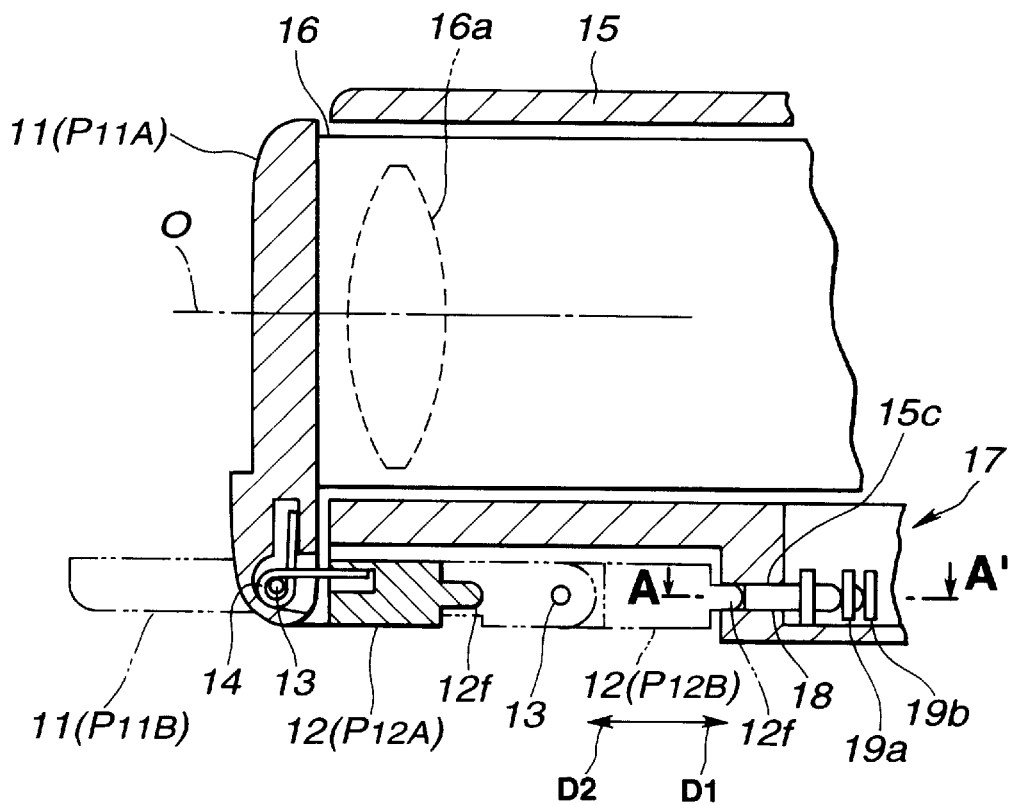
FIG. 10 is a vertical cross-sectional view showing the periphery of the lens barrel section of the FIG. 7 lens cover mounted camera.
Figure 11:
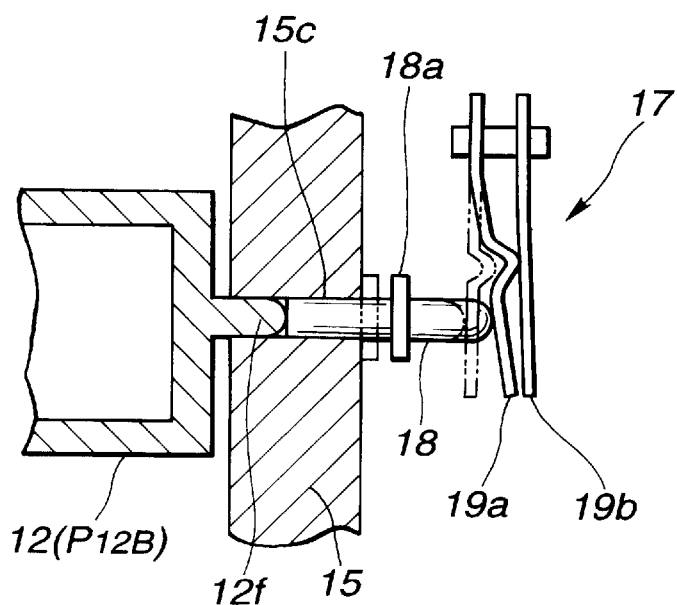
FIG. 11 is a cross-sectional view taken along a line 11–11' of FIG. 10.

FIGS. 7 and 8 are perspective views showing an appearance of a camera with a lens according to a third embodiment of this invention. In FIG. 7, the lens cover is in the closing condition to make the non-photographing condition, while in FIG. 8 the lens cover is in the opening condition to make the photographing condition. Further, FIG. 9 is a side elevational view showing a periphery of a lens barrel section of the camera shown in, FIG. 7, FIG. 10 is a vertical cross-sectional view showing a periphery of a lens barrel section of the FIG. 7 camera, and FIG. 11 is a cross-sectional view taken along a line 11–11' of FIG. 10.

As shown in FIGS. 7 and 8, a lens cover mechanism of the lens cover mounted camera, designated as numeral 20, according to this embodiment comprises a slide supporting section for supporting a cover supporting body at a lower portion of a front cover 15 forming an armoring body for covering a lens barrel frame 16 to allow it to be slidable, the lens cover supporting body 12 serving as a moving means, an overturnable lens cover 11 rotatably supported by the lens cover supporting body 12 and made to selectively take a closing condition that covers the front surface of a photographing lens 16a held by the lens barrel frame 16 and an opening condition that exposes the front surface thereof, and a main switch section 17 (see FIG. 10) being a power supply switch placed within the front cover 15 to be ON-OFF-operated by the lens cover supporting body 12.

The supporting section located at the lower portion of the front cover 15 of the camera 20 is composed of guide grooves 15a, 15b extending in parallel to the photographing lens optical axis O, and projecting portions 12d, 12e of the lens cover supporting body 12 are respectively inserted thereinto to be slidable. The guide grooves 15a are made transversely in right and left sides in an opposed relation to each other.

The supporting body 12 has a shaft hole 12c being a hole made at its tip portion and fixedly accepting a supporting shaft 13 for supporting the lens cover 11 to allow it to be rotatable, an operating section 12a including a finger-receiving recess portion 12b for sliding the operating section 12a itself along the front cover 15, projecting portions 12d made in parallel along the sliding directions on right and left sides and in an opposed relation to each other in width directions, a falling-down preventing projecting portion 12e formed on an upper end portion of the operating section 12a for preventing the falling-down of the operating section 12a, and a projecting portion 12f (see FIGS. 9 and 10) for pressing and operating the main switch section 17.

The aforesaid lens cover 11 has, at its proximal portion, a shaft hole which can rotatably accommodate the supporting shaft 13, and the supporting shaft 13 is inserted into the shaft hole of the lens cover 11 in a state where a torsion spring 14 (see FIG. 10) is put therein and is fixed at the shaft hole 12c made in the front end portion of the supporting body 12. Accordingly, the lens cover 11 is rotatably supported by the supporting body 12 in a state of being biased by the torsion spring 14 in its closing direction.

As shown in FIGS. 7, 9 and 10, when the lens cover supporting body 12 sliding-moves forwardly to reach a forward position P12A being a first position and the lens barrel frame 16 is in the retracted condition, the lens cover 11 rotates clockwise (see FIGS. 9 and 10) due to the biasing force of the torsion spring 14 to reach a closing position P11A at which it covers the photographing lens 16a. On the other hand, as shown in FIG. 8 or as indicated by two-dot chain lines in FIGS. 9 and 10, when the lens cover supporting body 12 sliding-moves backwardly to reach a rearward position P12B being a second position, the supporting shaft 3 is drawn toward a position below the front cover 15.

Accordingly, the lens cover 11 is rotated counterclockwise (see FIGS. 9 and 10) against the biasing force of the torsion spring 14 to arrive at a closing position P11B at which it allows the photographing lens 16a to come into existence. In this state, the lens cover supporting body 12 is maintained at the aforesaid rearward position P12B by means of a non-shown click mechanism. Further, the biasing force for biasing the lens cover 1 clockwise does not act as a side pressure on the lens barrel frame 16 because it is received by a lower surface portion of the front cover 15.

The aforesaid main switch section 17 is inserted into an insertion hole 15c made in a lower portion of the front cover 15 to be slidable, and is composed of a pressing pin 18 to be pressing-operated by the projecting portion 12f of the supporting body 12 and two electric armatures 19a, 19b to be pressed by the pressing pin 18. In a state where the pressing pin 18 is released from the pressing by the projecting portion 12f of the lens cover supporting body 12, the pressing pin 18 is pressed in the forward direction D2 by the biasing force of the electric armature 19a to maintain a flange portion 18a into a contacting condition with the front cover 15.

Besides, the electric armatures 19a, 19b are kept to be separated from each other, that is, the main switch section 17 is maintained to be in the OFF condition (condition indicated by a two-dot chain line in FIG. 11). Incidentally, when the main switch is in the OFF condition, the lens barrel frame 16 is retracted to the retracted position, and when going into the ON condition, the lens barrel frame 16 is protruded to the photographing position.

Furthermore, a description will be made hereinbelow of opening and closing operations of the lens cover mechanism of the lens cover mounted camera thus constructed according to the third embodiment of this invention.

First, for changing from the lens cover closing condition being the non-photographing condition shown in FIG. 7 to the lens cover opening condition being the photographing condition shown in FIG. 8, the user's finger is put on the finger-putting recess portion 12b of the operating section 12a of the lens cover supporting body 12 to pressing-operate the lens cover supporting body 12 in the backward direction D1 being the first direction in parallel to the optical axis O, so that the lens cover supporting body 12 is sliding-moved rearwardly along the guide grooves 15a, 15b of the front cover 15. With this movement, the supporting shaft 13 also moves rearwardly, with the result that the lens cover 11 comes into contact with a front end lower portion of the front cover 15 and is pulled to the bottom section of the front cover 15 while being rotated counterclockwise around the supporting shaft 13 in the opening direction against the biasing force of the torsion spring 14.

With the above-mentioned operations, as shown in FIG. 8 or as indicated by the two-dot chain line in FIG. 9, when the lens cover supporting body 12 reaches the rear position P12B forming the end point, the lens cover 11 rotates up to the opening position P11B so that the front surface of the photographing lens 16a appears. In this state, the projection 12f of the lens cover supporting body 12 fits into the insertion hole 15c of the front cover 15 to press the pressing pin 18 of the main switch section 17 as shown in FIG. 11. Accordingly, the electric armature 19a is brought into contact with the electric armature 19b to create the main switch ON condition, so that the lens barrel frame 16 protrudes, thus setting the camera 20 into the photographing condition.

On the other hand, for changing from the lens cover opening condition being the photographing condition shown in FIG. 8 to the lens cover closing condition being the non-photographing condition shown in FIG. 7, likewise, the user's finger is put on the finger-putting recess portion 12b of the operating section 12a of the lens cover supporting body 12 to pressing-operate the lens cover supporting body 12 in the forward direction D2 being the second direction in parallel to the optical axis, so that the lens cover supporting body 12 is sliding-moved forwardly along the guide grooves 15a, 15b of the front cover 15.

With this movement, the projection 12f of the lens cover supporting body 12 retreats from the insertion hole 15c of the front cover 15 so that the pressing pin 18 of the main switch section 17 is released from its pressing operation as indicated by the two-dot chain line in FIG. 11 to cause the flange portion 18a to come into contact with the surface around the end of the insertion hole 15c of the front cover 15. Further, the electric armature 19a takes the separated condition from the electric armature 19b so that the main switch section 17 turns into the OFF condition. The OFF condition of the main switch section 17 starts the retraction of the lens barrel frame 16.

Furthermore, the forward movement of the lens cover supporting body 12 moves the supporting shaft 13 forwardly, and the lens cover 11 rotates clockwise in the closing direction around the supporting shaft 13 due to the biasing force of the torsion spring 14. Further, as shown in FIGS. 7 and 9, when the lens cover supporting body 12 reaches the forward position P12A and the lens barrel frame 16 arrives at the retracted position, the lens cover 11 rotates up to the closing position P11A by the biasing force of the torsion spring 14 to cover the front surface of the photographing lens 16a, thus bringing the camera 20 into the non-photographing condition.

As described above, the lens cover mounted camera according to this embodiment is equipped with the overturnable lens cover, and the lens cover supporting body 12 slidable in the optical axis directions and the operating section 12a thereof are disposed in the vicinity of the lower side of the front cover 15 and, hence, the lens cover opening and closing operations become stable, and further, since an extra side pressure due to the lens cover 11 does not work on the lens barrel frame 16 in the photographing condition, the deterioration of the photographing accuracy is preventable and the stable photographing becomes possible.

Still further, since the ON-OFF operations of the power supply switch section 17 are feasible in connection with the lens cover opening and closing operations, the switching between the camera photographing condition and the camera non-photographing condition is possible with only the lens cover opening and closing operations, with the result that the troublesomeness is eliminated in a manner unlike the prior camera mentioned previously.

Figure 12:
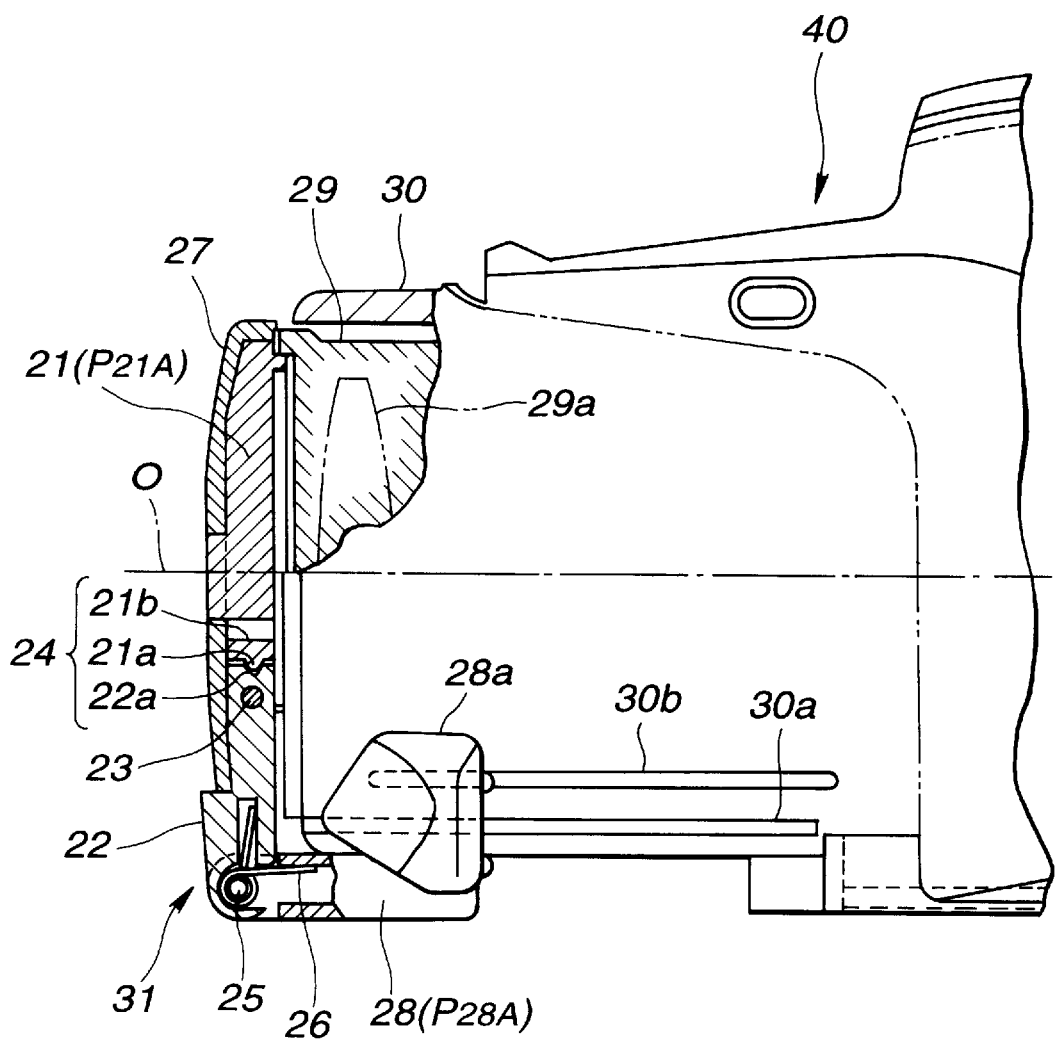
FIG. 12 is a partial side elevational view showing a barrel of a camera with a lens cover according to a fourth embodiment of this invention, where the lens cover is in a closing condition and the camera is in a non-operating condition.
Figure 13:
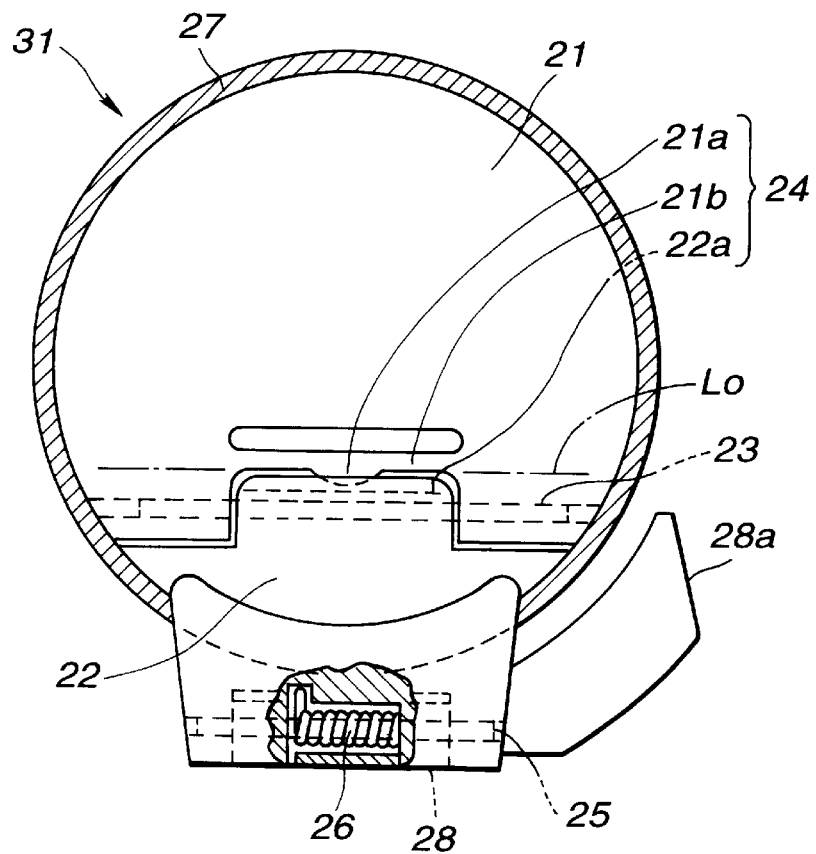
FIG. 13 is a vertical cross-sectional view showing a lens cover section of the FIG. 12 lens cover mounted camera, viewed from a subject side.

FIG. 12 is a side elevational view showing a lens barrel section of a camera with a lens cover according to a fourth embodiment of this invention, and FIG. 13 is a vertical cross-sectional view showing a lens cover section for or of the lens barrel of the FIG. 12 lens cover mounted camera, viewed from the subject side.

Into the lens cover mounted camera 40 there is incorporated a lens barrel 29 for holding a photographing lens 29a within a front cover 30 of a camera body, and on a front surface section of the lens barrel 29 there is placed a lens cover section 31 which is openable and closable.

The lens cover section 31 is basically made up of a cover holder 28 slidable and having a cover operating section 28a guided by a guide groove(s) 30a of a front cover 30, a cover supporting shaft 25 being a first supporting shaft fixedly secured to the cover holder 28, a lens cover base plate 22 supported rotatably by the cover supporting shaft 25 to serve as a lens cover base section, a hinge shaft 23 fixedly secured to the lens cover base plate 22 to serve as a second supporting shaft, a lens cover 21 supported rotatably by the hinge shaft 23 to form a lens cover tip portion, a lens cover rubber 27 fixedly adhered onto the lens cover 21 to cover its external section, and a biasing spring 26 being a torsion spring for biasing the lens cover base plate 22 in a cover closing direction.

Figure 15:
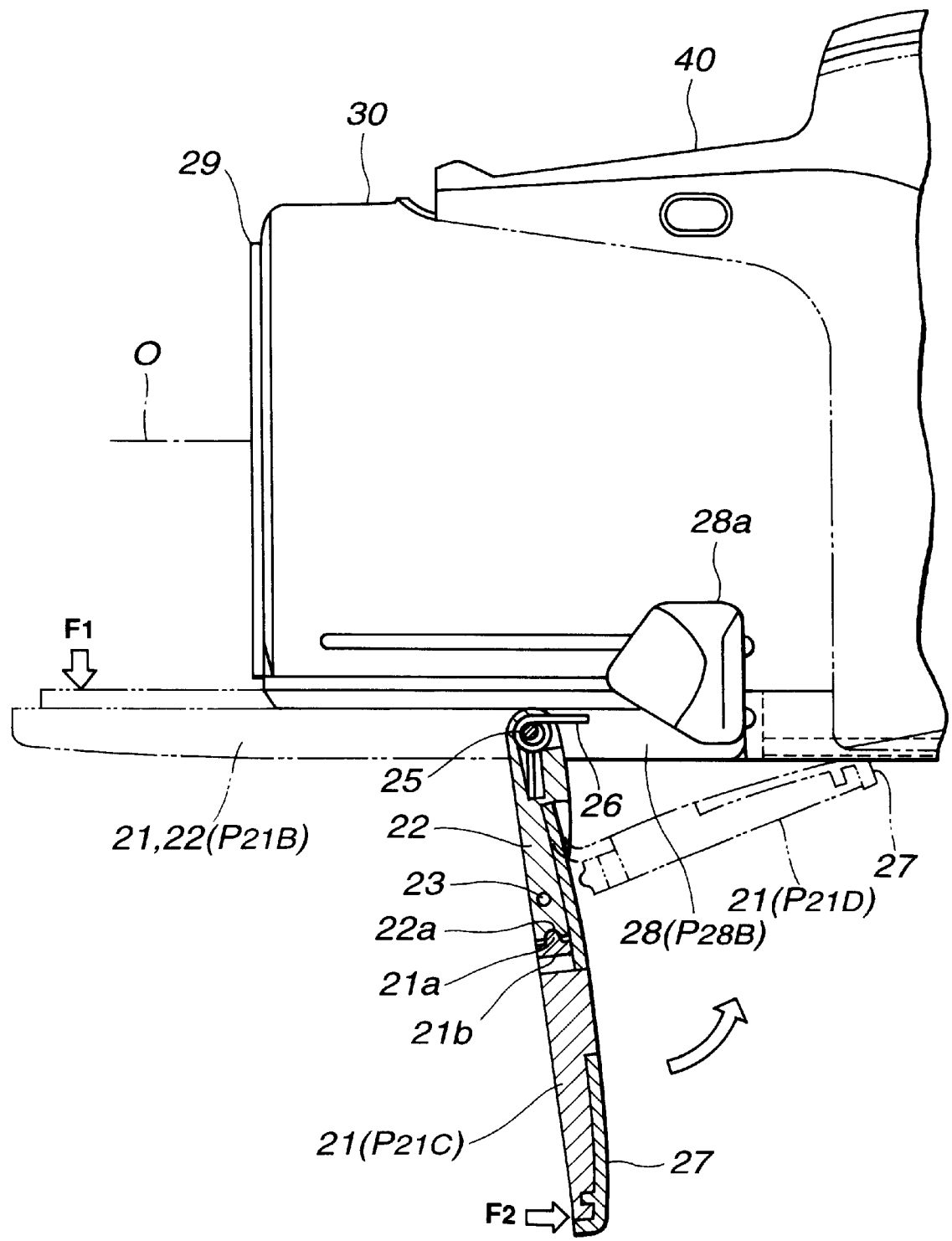
FIG. 15 is a side elevational view showing a lens cover opening condition with respect to the barrel of the FIG. 12 lens cover mounted camera.

The cover holder 28 is disposed at a position below the lens barrel 29, and is slidable in directions parallel with the lens optical axis O in a state of being guided by the guide groove 30a of the front cover 30. Its moved position is between a forward position P28A (see FIG. 12) at which the lens cover 21 closes the lens barrel 29 and a rearward position P28B (see FIG. 15 showing a lens barrel open condition) at which it opens the lens barrel 29. Incidentally, the cover supporting shaft 25 for supporting the lens cover base plate 22 is located at a position below the lens barrel 29 along a direction orthogonal to the optical axis O, and the foregoing opening and closing of the lens barrel 29 are achieved in a manner that the lens cover 21 and the lens cover base plate 22 are rotated around the supporting shaft 25.

The lens cover 21 and the lens cover base plate 22 are rotatably connected to each other through the hinge shaft 23 situated in parallel with the cover supporting shaft 25, and further, a click stop mechanism 24 serving as a locking means is placed at a position above the hinge shaft 23 to make the division between the lens cover 21 and the lens cover base plate 22 along a division line L0 drawn in parallel to the hinge shaft 23. Ordinary, the lens cover 21 and the lens cover base plate 22 are integrally held by means of the click stop mechanism 24, and in this state, the above-mentioned opening and closing operations for the lens barrel are done. However, if an external force exceeding a predetermined force is applied to the lens cover 21 when the lens cover base plate 22 is in the rotation inhibited condition, the lens cover 21 is released from the locking by the click stop mechanism 24 so that the lens cover 21 is singly rotatable independently of the lens cover base plate 22 with respect to the division line L0.

Secondly, a description will be given hereinbelow of a structure and others of the aforesaid click stop mechanism 24. This mechanism 24 is made up of a V-shaped groove 22a of the lens cover base plate 22 made along the hinge shaft 23, and a projection 21a fitted in the V-shaped groove 22a to serve as a connecting member for the connection to the lens cover 21 in the locked condition. In an upper portion of the projection 21a of the lens cover 21 there is an elongated hole extending in parallel to the hinge shaft 23 to define a thin-wall portion 21b. The lens cover 21 is made of a synthetic resin deformable elastically, and therefore, the thin-wall portion 21b is also deformable elastically.

Figure 14A:
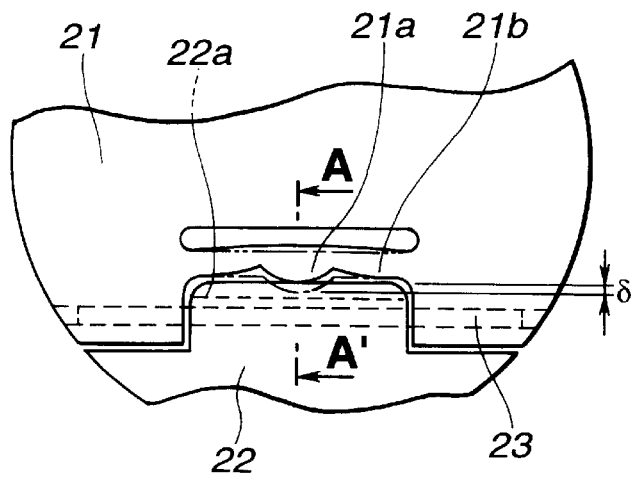
FIG. 14A is a front elevational view showing an operating condition of a click stop mechanism of the lens cover section on the barrel of the FIG. 12 lens cover mounted camera.
Figure 14B:
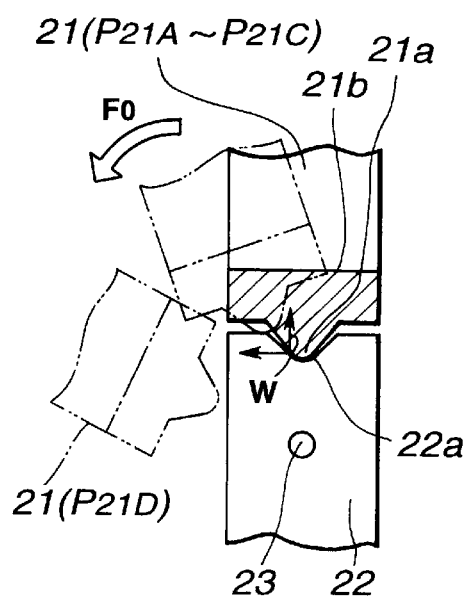
FIG. 14B is a cross-sectional view taken along a line 14B–14B' of FIG. 14A.

FIG. 14A is a front elevational view showing an operating condition of the above-mentioned click stop mechanism 24, and FIG. 14B is a cross-sectional view taken along a line 14–14B' of FIG. 14A.

If an external force indicated by an arrow F0, exceeding a predetermined force, is applied to the lens cover 21 in a rotating direction in a state where the lens cover base plate 22 is in the rotation inhibited condition, as shown in FIG. 14B, an upward force W works on the projecting portion 21a through the V-shaped groove 22a in terms of the click stop mechanism 24 being in a locking condition. Due to that force W, the thin-wall portion 21b for supporting the projecting portion 21a deforms by a deflection quantity δ to raise the projecting portion 21a, so that the locking terminates. Further, the lens cover 21 rotates around the hinge shaft 23 in a direction from the locked positions P21A to P21C to the lock-released position P21D with respect to the lens cover base plate 22. Following this, when the lens cover 21 is rotated in the returning direction, the lens cover 21 returns to the position P21A causing the locking condition.

Moreover, a description will be taken hereinbelow of opening and closing operations of the lens cover section of the lens barrel of the lens cover mounted lens thus constructed according to this embodiment and of other operations.

When the camera is in the non-using (non-photographing) condition, as shown in FIG. 12, the cover holder 28 is at the forward position P28A while the lens cover 21 is biased by the biasing spring 26 in the closing direction in a state where the click stop mechanism 24 is in the locking condition to make the integral condition with the lens cover base plate 22 to reach the lens closing position P21A at which it covers the lens barrel 29.

For setting the camera into the use-allowable (photographing) condition, the cover operating section 28a is operated so that the cover supporting body 28 is pulled up to the retreated position existing under the front cover bottom section along the front cover guides 30a, 30b. With this operation, as shown in the side elevational view of FIG. 15 showing the lens barrel mounted lens cover opening condition, the lens cover 21 and the lens cover base plate 22 rotate around the supporting shaft 25 so that the lens cover 21 reaches the lens opening position P21b (indicated by a two-dot chain line), thus permitting the camera to take the photographing action.

In this opening condition, if a careless external force, indicated by an arrow F1, exceeding the biasing force of the biasing spring 26 acts on the tip portion of the lens cover 21, as shown in FIG. 15, the lens cover 21 and the lens cover base plate 22 are rotated up to the rotational position P21C against the biasing spring 26 to absorb the external force F1. In this case, if the lens cover 21 is released from the external force F1, the lens cover 21 and the lens cover base plate 22 return to the original lens opening position P21B (indicated by the two-dot chain line).

In addition, in the case that a greater external force indicated by an arrow F2, such as an impact or gripping force, is applied to the tip portion of the lens cover 21, since the rotational supporting point portion acts with respect to the lens cover base plate 22 at the rotational position P21C, the disengagement of the projecting portion 21a in the click stop mechanism 24 occurs as described with reference to FIG. 14B. Further, only the lens cover 21 is rotated up to the rotational position P21D at which it comes into contact with the bottom surface of the front cover 30. Incidentally, in aforesaid rotating condition, the lens cover rubber 27 merely deforms.

This rotating motion can absorb the greater external force F2 such as an impact, thereby preventing damage or breakdown to the lens cover 21, the lens cover base plate 22 and other components.

Besides, after the disengagement of the projecting portion 21a in the click stop mechanism 24 occurs so that the lens cover 21 is rotated up to the rotational position P21D, for returning it to the original condition, an opposite force is applied to the lens cover 21 to cause the lens cover 21 to be rotated around the hinge shaft 23 so that the projecting portion 21a is locked with the V-shaped groove 22a.

As described above, in the lens cover mounted camera 40 according to the fourth embodiment, the lens cover section 31 for opening and closing the lens surface of the lens barrel is composed of the lens cover 21 and the lens cover base plate 22 which are coupled to each other through the click stop mechanism 24, and hence, when a careless external force works on the lens cover 21, for example, in the case that the lens cover 21 is gripped and lifted or in the case that the camera 40 drops to, cause an excessive force to act on the lens cover 21, that force can easily and automatically be absorbed by the disengagement effect of the click stop mechanism 24 to certainly prevent the damage to the lens cover section 31. In addition, the disengagement condition of the click stop mechanism 24 does not signify the fully separated condition between the lens cover 21 and the lens cover base plate 22 but means only the separation of the locking portion, and therefore, if that locking portion is placed into the locking condition, the original condition is readily restorable.

Moreover, a description will be made hereinbelow of a lens barrel of a camera with a lens cover according to a fifth embodiment of this invention.

Figure 16A:
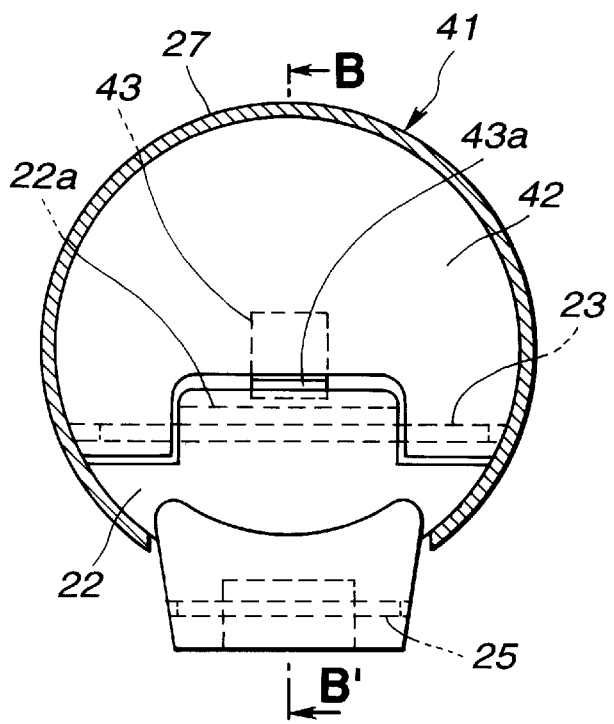
FIG. 16A is a front elevational view showing a lens cover section closing condition with respect to a barrel of a camera with a lens cover according to a fifth embodiment of this invention.
Figure 16B:
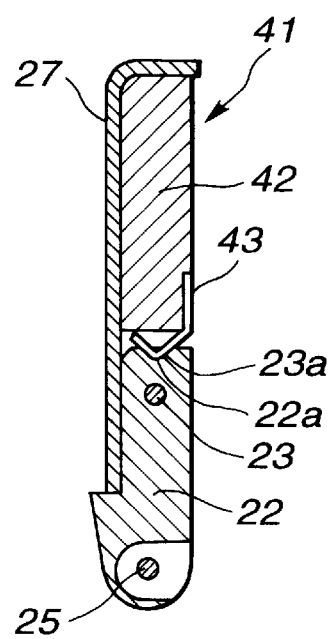
FIG. 16B is a cross-sectional view taken along a line 16B–16B' of FIG. 16A.

In this embodiment, a lens barrel of the lens cover mounted camera is different in the construction of the click stop mechanism to be incorporated into a lens cover section thereof from the above-described fourth embodiment. FIG. 16A is a front elevational view showing a closing condition of a lens cover section 21 for a lens barrel of a lens cover mounted camera according to this embodiment, and FIG. 16B is a cross-sectional view taken along a line 16B–16B' of FIG. 16A. In this embodiment, the cover supporting body and biasing spring constituting the lens cover section are similar in construction to the above-described fourth embodiment, and hence, these elements are omitted from the illustration.

As shown in FIGS. 16A and 16B, in the lens cover designated at numeral 41, a plate spring 43 serving as a connecting member made of a metal to be deformable elastically and equipped with a projecting portion 43a is attached to a lens cover 42. In the ordinary condition, the projecting portion 43a is locked with a V-shaped groove 22a of a lens cover base plate 22.

As in the case of the above-described fourth embodiment, the aforesaid projecting portion 43a normally assumes a locking condition until the lens cover 42 varies from the opening position P21B (see FIG. 15) to the rotational position P21C (see FIG. 15) to be taken when an external force of a given value works thereon. In this state, in the case that a greater careless external force acts on the lens cover 42, a force which lifts the projecting portion 43a works through the V-shaped groove 22a, and the plate spring 43 elastically deforms so that the disengagement between the projecting portion 43a and the V-shaped groove 22a occurs. Owing to this releasing from the locking condition, the lens cover 42 rotates with respect to the lens cover base plate 22, thus preventing the damages to the lens cover section 41. The other opening and closing operations with respect to the lens barrel and others are the same as those of the above-described fourth embodiment.

In the case of the lens barrel of the lens cover mounted camera according to this embodiment, since the plate spring 43 is constructed as a metallic spring, it is possible to set a greater elastically deforming quantity, and even if a careless impact or the like acts on the lens cover 42, the lens cover section 41 is surely protected by releasing from the locking condition between the lens cover 42 and the lens cover base plate 22. In addition, after releasing from the locking condition, the lens cover section 41 is easily restorable.

Furthermore, a description will be made hereinbelow of a lens barrel of a camera with a lens cover according to a sixth embodiment of this invention.

In this embodiment, in a lens cover section of a lens barrel of a lens cover mounted camera, a lens cover and a lens cover base plate are covered with a bag-like elastically deformable lens cover rubber, instead of the foregoing click stop mechanism.

Figure 17A:
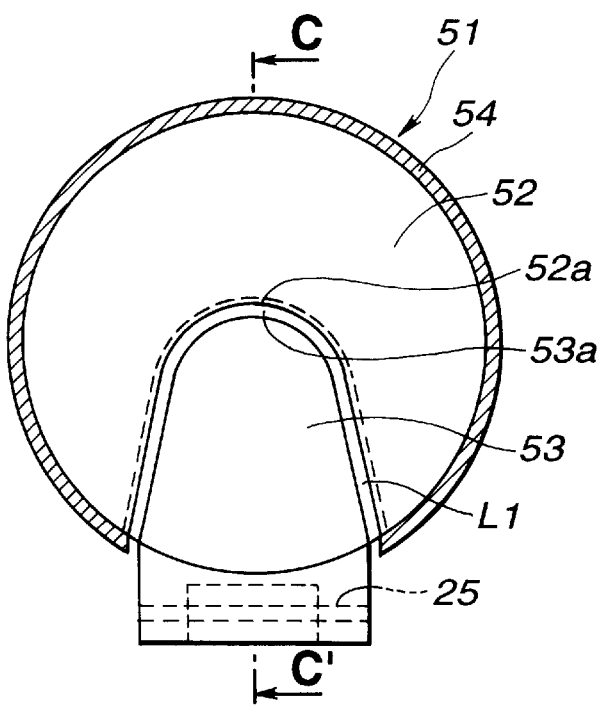
FIG. 17A is a front elevational view showing a lens cover section closing condition with respect to a barrel of a camera with a lens cover according to a sixth embodiment of this invention.
Figure 17B:
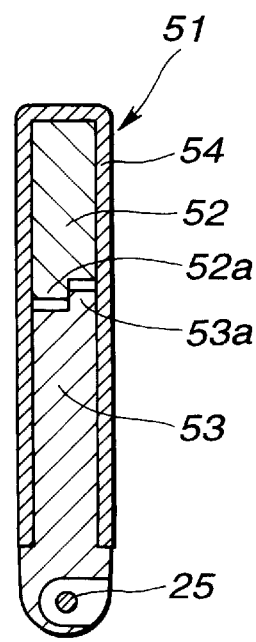
FIG. 17B is a cross-sectional view taken along a line 17B–17B' of FIG. 17A.

FIG. 17A is a front elevational view showing a closing condition of a lens cover section 51 applied to a lens barrel of the lens cover mounted camera according to this embodiment, and FIG. 17B is a cross-sectional view taken along a line 17B–17B'. In this construction, the cover supporting body, biasing spring and other components constituting the lens cover section are the same as those of the above-described fourth embodiment, and hence, the same components are omitted from the illustration.

As shown in FIGS. 17A and 17B, in the lens cover section 51, step portions 52a and 53a are provided in a lens cover 52 and a lens cover base plate 53 to come into contact with the lens cover base plate 53 and the lens cover 52, respectively. Further, a locus of a division line L1 viewed from the front sides of the step portions 52a, 53a assumes a substantially U-like configuration. Still further, the lens cover 52 and the lens cover base plate 53 are covered with a lens cover rubber 54 serving as a connecting member deformable elastically. In the regular condition, the aforesaid step portions 52a, 53a are kept to be in the contacting conditions owing to the lens cover rubber 54 so that the lens cover 52 and the lens cover base plate 53 both tie in a common plane.

As well as the above-described fourth embodiment, when a careless external force exceeding a given value works on the lens cover 52 in a rotating direction while the lens cover section 51 is in the releasing or opening condition, the lens cover rubber 54 deforms to cause the step portions 52a, 53a to be released from the contacting conditions so that the lens cover 52 and the lens cover base plate 53 are angled with respect to each other to make a doglegged configuration. Whereupon, the aforesaid external force is absorbable to prevent the damages or breakage to the lens cover section 51. Incidentally, on releasing from the aforesaid external force, the lens cover 52 and the lens cover base plate 53 return to the original conditions.

Accordingly, the lens barrel of the lens cover mounted camera according to this embodiment eliminates the need for the installation of a click stop mechanism, thus simplifying the construction to reduce the cost. In addition, after the removal of the aforesaid external force, the lens cover 52 and the lens cover base plate 53 can readily return to the original conditions.

Still further, a description will be made hereinbelow of a lens barrel of a camera with a lens cover according to a seventh embodiment of this invention.

In this embodiment, in a lens barrel of the lens cover mounted camera, the structure of a click section of a click stop mechanism incorporated into a lens cover section to be mounted differs from that of the above-described fourth embodiment. FIG. 18A is a front elevational view showing a closing condition of a lens cover section 61 of a lens barrel according to this embodiment, and FIG. 18B is a cross-sectional view taken along a line 18B–18B'. In this construction, the cover supporting body, biasing spring and other components constituting the lens cover section are the same as those of the above-described fourth embodiment, and hence, the same components are omitted from the illustration.

As shown in FIGS. 18A and 18B, in the lens cover section 61, a click pin 63 serving as a connecting member protrudable and retractable is provided in a lens cover 62, and the click pin 63 is biased by a coil spring 64 acting as a connecting member built in the lens cover 62 to be locked with a V-shaped groove 22a of a lens cover base plate 22. As in the above-described fourth embodiment, in the locking condition therebetween, the lens cover 62 is rotatable integrally with the lens cover base plate 22 at the regular opening and closing operations for the lens barrel and until the lens cover base plate 22 reaches a rotation limit.

In the opening condition, as in the above-described fourth embodiment, if a careless external force exceeding a given value acts on the lens cover 62 in its rotating direction, a force which lifts the click pin 63 occurs through the V-shaped groove 22a so that the click pin 63 is lifted against the biasing force of the coil spring 64 to be released from the engaging condition with the V-shaped groove 22a. Owing to the releasing from the engaging condition, the lens cover 62 rotates with respect to the lens cover base plate 22, with the result that the breakage of the lens cover section 61 due to the aforesaid external force is avoidable.

The lens barrel according to this embodiment allows a large elastic deforming quantity because the coil spring 64 is used as the biasing member for the click pin 63, and even if a careless shock or the like is applied to the lens cover 62, the lens cover 62 and the lens cover base plate 22 are surely released from the engaging relation to each other to protect the lens cover section 61. In addition, on releasing from the engaging condition, the restoration to the original condition is easily possible.

As a modification of the above-described embodiments, it is also acceptable that, for example, the lens cover 21 and the lens cover base plate 22 are coupled to each other through a connecting elastic member such as a metallic plate spring and a hard rubber in place of being coupled through the hinge shaft 23. In the case of employing such an elastic member, if a strong force works on the lens cover 21 while the lens cover is in the opening condition, this elastic member deforms to allow the lens cover 21 to further rotate in the opening direction, which prevents the lens cover section 61 from suffering damage.

Furthermore, although, in the above-described embodiments or in the modification, the lens cover section has been described above as a construction in which the lens cover is made as a separately movable part with respect to the lens cover base plate and is disengaged from the lens cover base plate, it is also appropriate that the lens cover is divided into three or more members being joined by a disengagement construction.

In the case of the lens cover mounted camera according to the fourth, fifth, sixth and seventh embodiments, the lens cover section is designed to have a construction in which the cover is divided into a tip section and a proximal section, and when an external force works on the tip section of the lens cover section in the opening direction while the lens cover section is at the open position, the lens cover tip section is further rotated in the opening direction around the second supporting shaft, so that damage to the lens cover components due to the aforesaid external force is certainly preventable. In addition, the separately moved section is easily restorable to the original condition.

Figure 19:
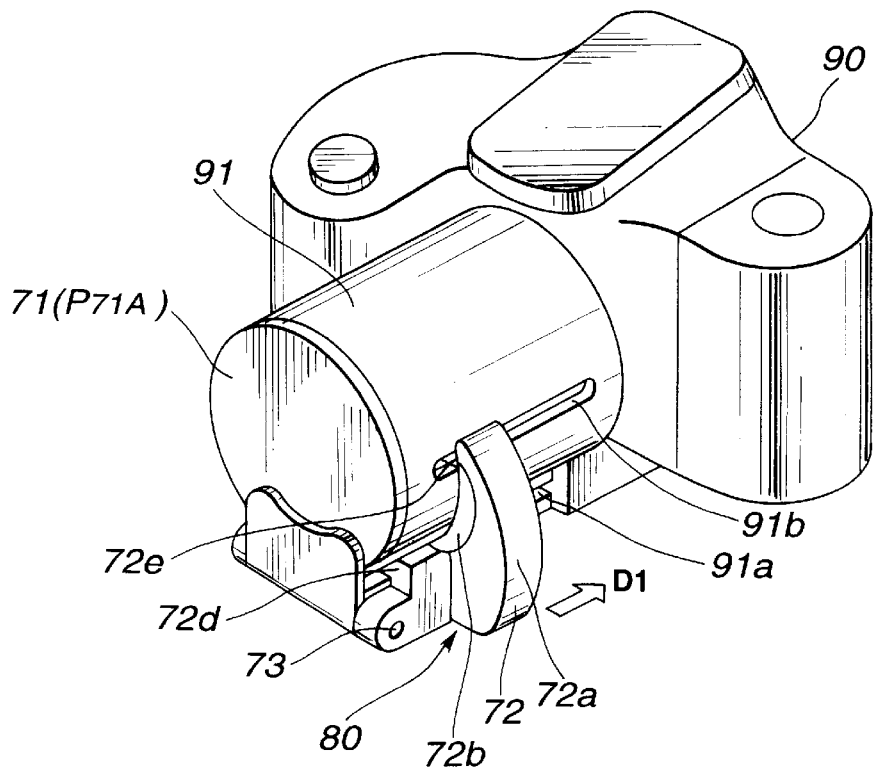
FIG. 19 is a perspective view schematically showing an appearance of a camera with a lens cover according to an eighth embodiment of this invention, where the lens cover is in a closing condition.
Figure 20:
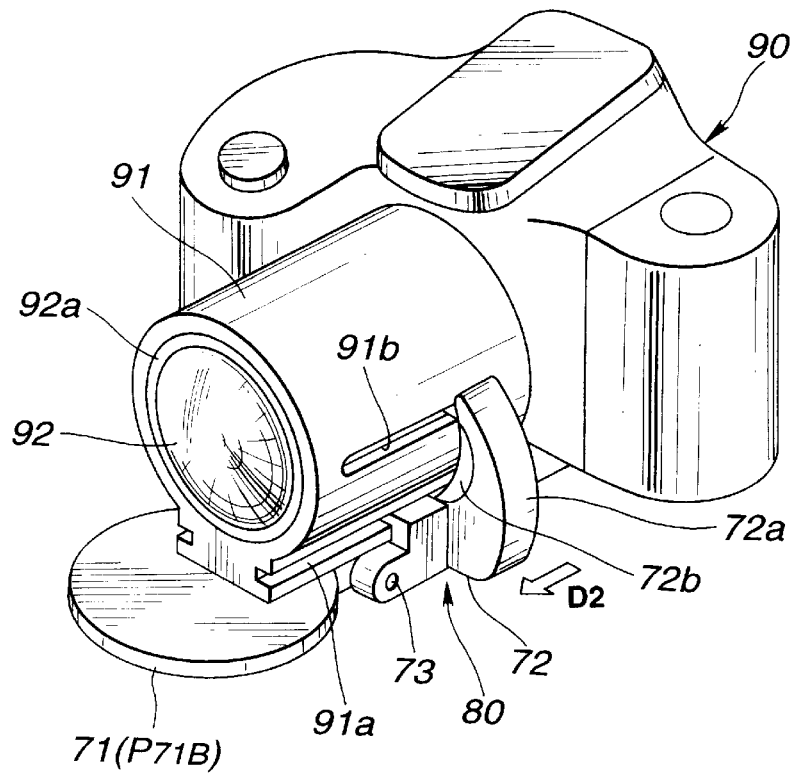
FIG. 20 is a perspective view schematically showing the appearance of the FIG. 19 lens cover mounted camera, where the lens cover is in an opening condition.
Figure 21:
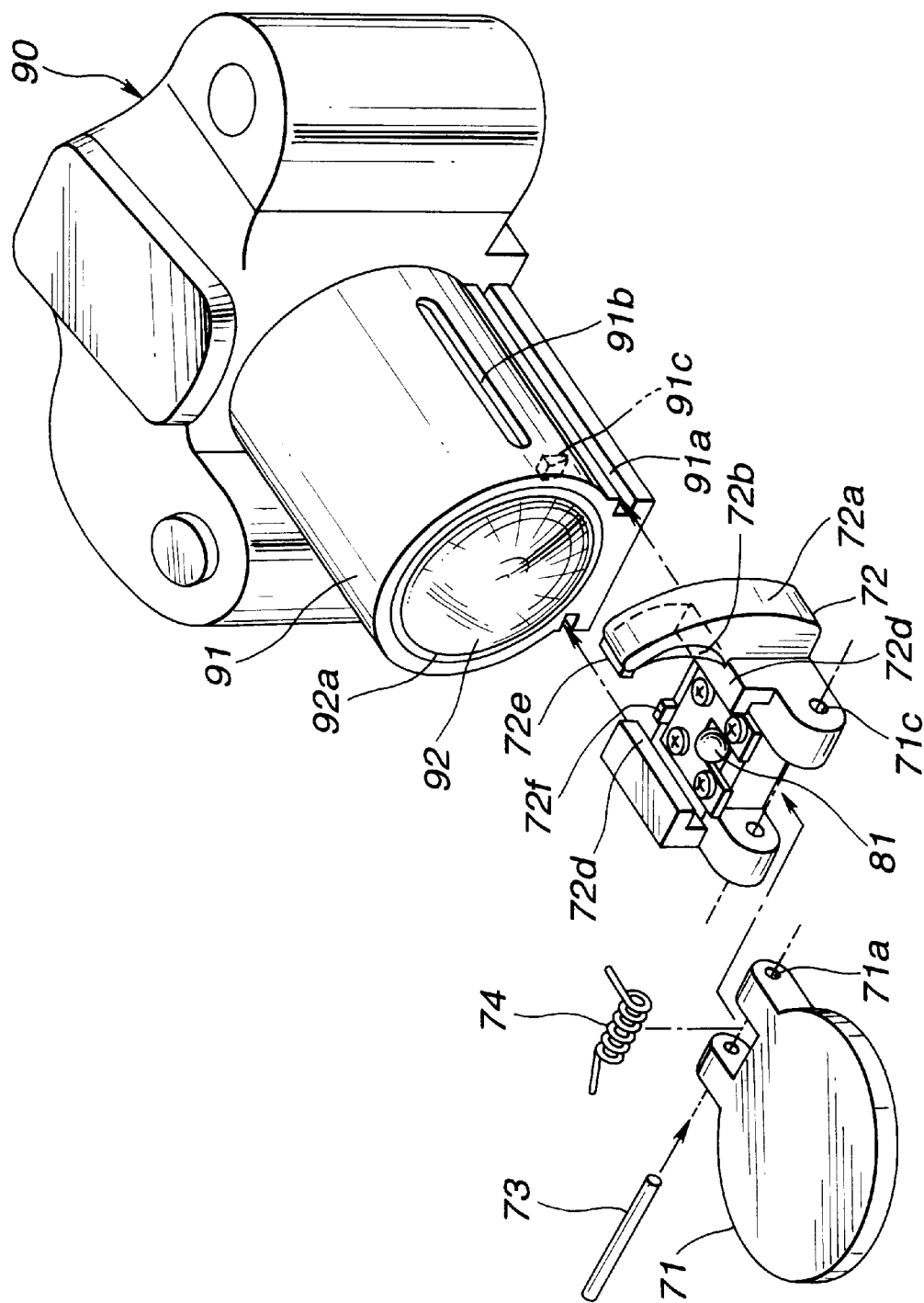
FIG. 21 is an exploded perspective view showing the FIG. 19 lens cover mounted camera.
Figure 22:
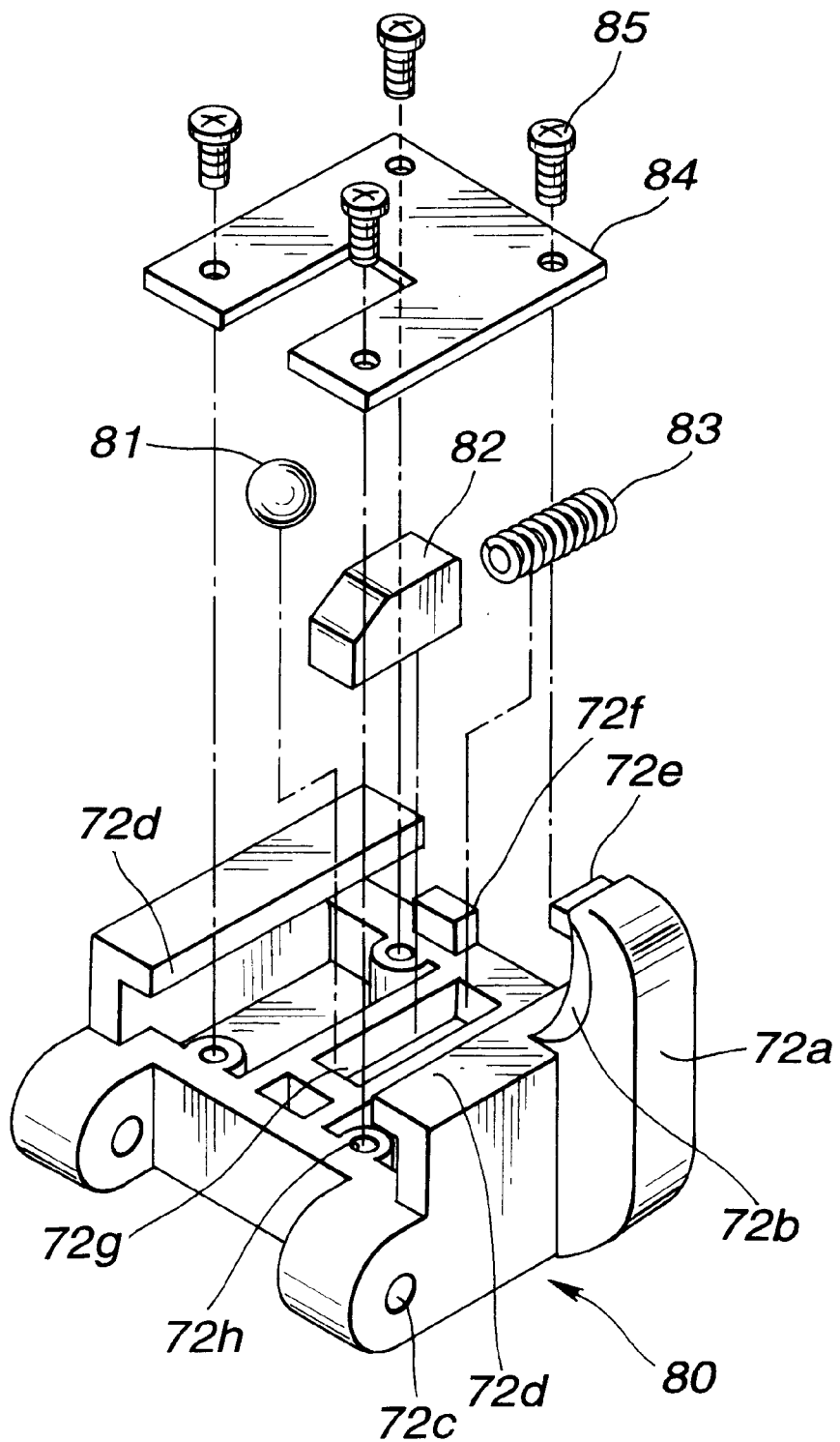
FIG. 22 is an exploded perspective view showing a lens cover supporting section of the FIG. 19 lens cover mounted camera.
Figure 23:
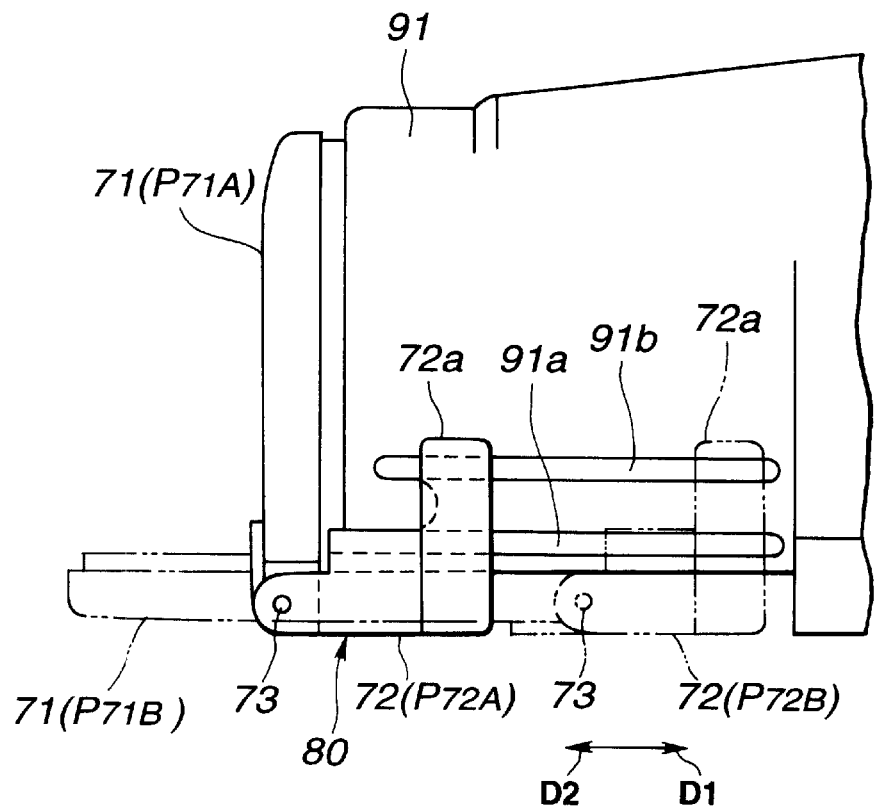
FIG. 23 is a side elevational view showing a camera front cover section and a lens cover section in a state where a lens filter is in a non-mounted condition in the FIG. 19 lens cover mounted camera.
Figure 24:
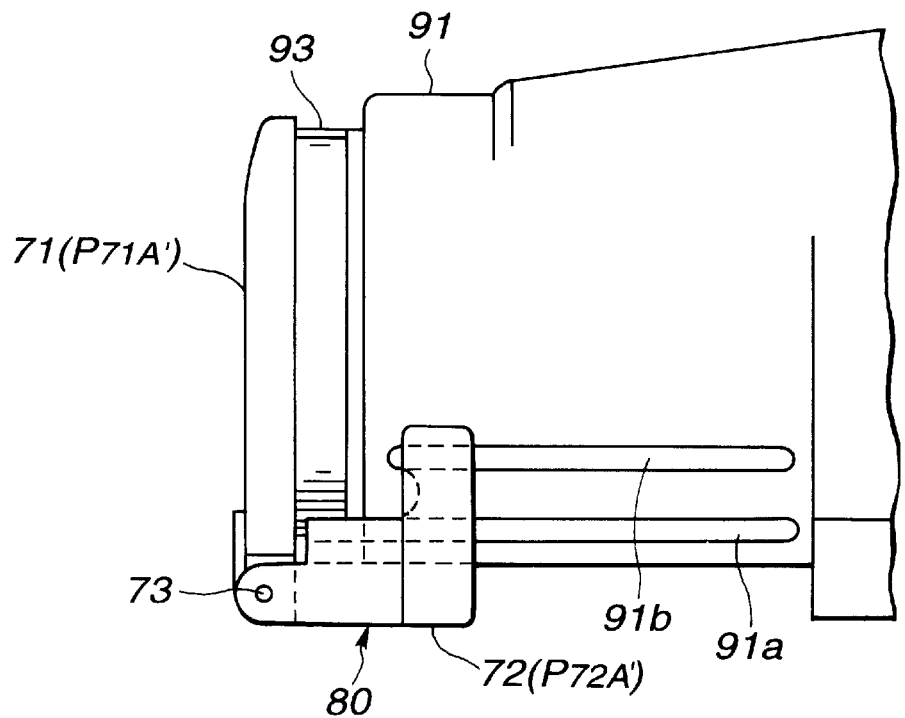
FIG. 24 is a side elevational view showing the camera front cover section and the lens cover section in a state where a lens filter is in a mounted condition in the FIG. 19 lens cover mounted camera and in a state where the lens cover is in a closing condition.
Figure 25A:
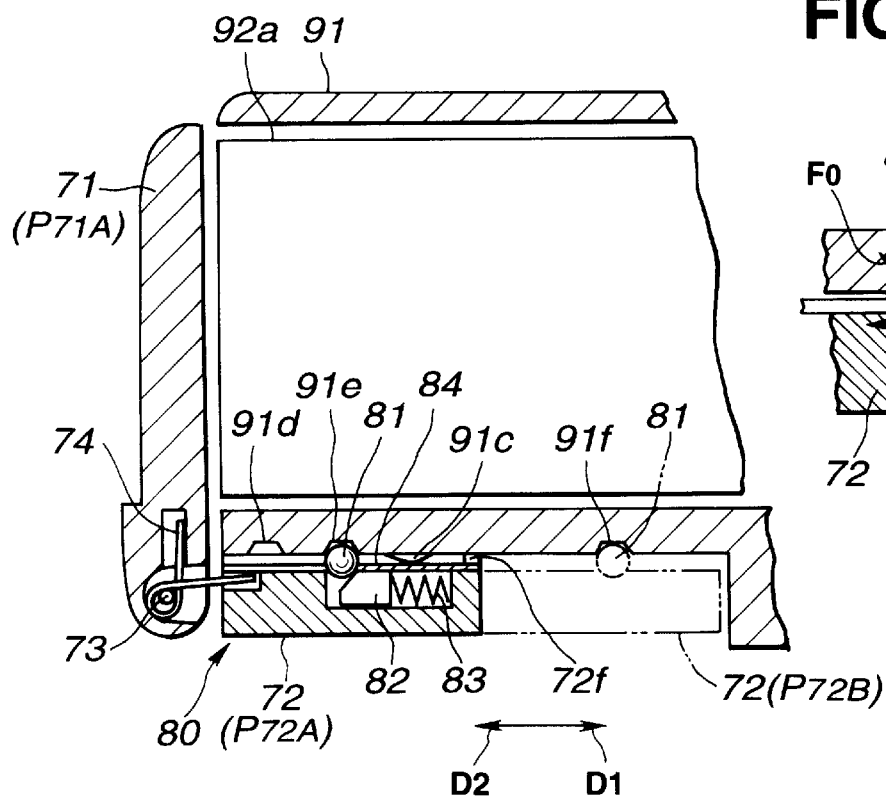
FIG. 25A is a cross-sectional view showing the camera front cover section and the lens cover section in the condition shown in FIG. 23.
Figure 25B:
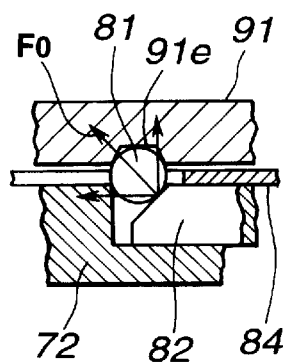
FIG. 25B is a partial cross-sectional view showing a click mechanism section in FIG. 25A.
Figure 26:
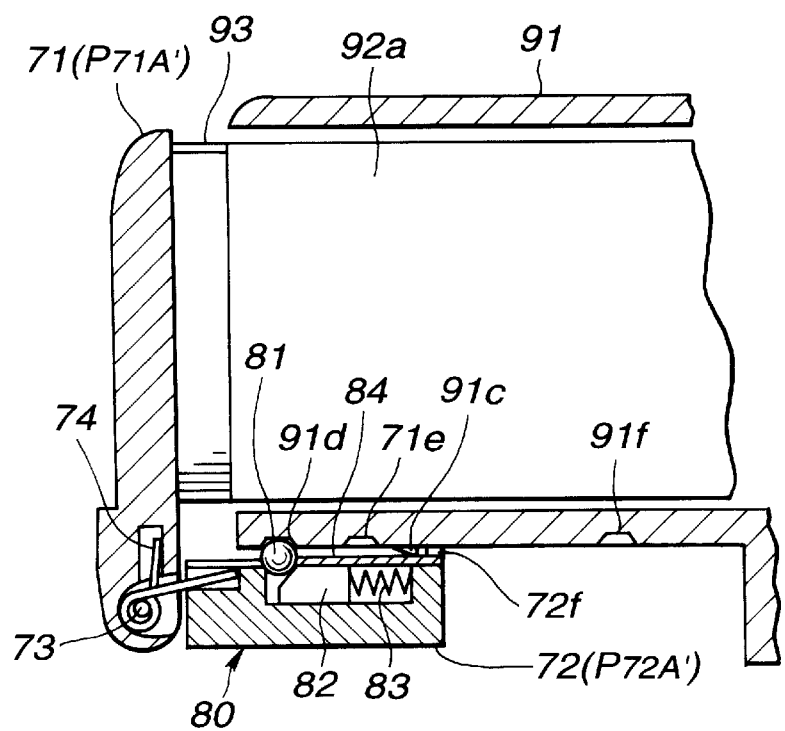
FIG. 26 is a cross-sectional view showing the camera front cover section and the lens cover section in the condition shown in FIG. 24.

FIGS. 19 and 20 are perspective views schematically showing an appearance of a camera with a lens cover according to an eighth embodiment of this invention. FIG. 19 shows a closing condition of the lens cover while FIG. 20 shows an opening condition of the lens cover. Further, FIG. 21 is an exploded perspective view showing the lens cover mounted camera, and FIG. 22 is an exploded perspective view showing a lens cover supporting section. Still further, FIGS. 23 and 24 are side elevational views showing a closing condition of the lens cover of the camera. FIG. 23 shows a non-mounted condition of a lens filter while FIG. 24 shows a mounted condition of the lens filter. Still further, FIG. 25A is a vertical cross-sectional view showing the condition of FIG. 23 while FIG. 25B is a partial cross-sectional view showing a click mechanism section in FIG. 25A. FIG. 26 is a vertical cross-sectional view showing the condition of FIG. 24.

In the lens cover mounted camera, designated by numeral 90, according to this embodiment, a lens barrel frame 92a serving as a camera front side armoring member is provided to hold a photographing lens 92 at a nearly central portion of a front cover 91, with the lens barrel frame 92a being made to be protrudable and extractable. In the non-photographing condition, the front surface of the photographing lens 92 is closed by an overturnable lens cover 71 as shown in FIG. 19. For opening the lens cover 71, a supporting body 72 for rotatably supporting the lens cover 71 is operated in a direction indicated by an arrow D1 in FIG. 19 so that the supporting body 72 slides in a state of being guided by a pedestal of an outer circumferential section of the front cover 91 or a side surface section thereof, which makes the lens cover 71 turn over in the opening direction and move under the front cover 91 as shown in FIG. 20, thereby opening the photographing lens 91 to establish the photographing condition.

Besides, in the camera according to this embodiment, in both of the cases that the lens filter 93 is not mounted on the front cover 91 and that the lens filter 93 is mounted thereon, the opening and closing conditions are achievable by the lens cover 71 (see FIGS. 23 and 24).

A detailed description will be given hereinbelow of constructions of the front cover 91 and lens cover section of the camera.

In the front cover 91, guide grooves 91a, 91b for guiding a supporting body 72 are made in a lower surface side pedestal and side surface of its outer circumferential section, and three locking click grooves 91d, 91e, 91f serving as fixing means are formed under the guide grooves 91a, 91b as shown in the cross-sectional views of FIGS. 25A and 25B so that a click ball 81 is fitted therein, and further, there is provided a projection 91c deformable elastically and serving to prevent the supporting body 72 from getting out of place.

A lens cover supporting section 80 for rotatably supporting the lens cover 71 is, as shown in FIG. 22, composed of the supporting body 72 being a lens cover supporting member, the click ball 81 being fixing means, a pressing piece 82, a pressing spring 83, a pressing plate 84 having a notch portion, and screws 85.

The supporting body 72 includes shaft holes 72c into which a supporting shaft 73 for rotatably supporting the lens cover 71 is inserted fixedly, an operating section 72a having a finger-receiving recess portion 72b for sliding the operating section 72a along the front cover 91, projecting portions 72d formed in parallel with the sliding directions and in an opposed relation to each other, a projection 72e formed at an upper end portion of the operating section 72a, a recess portion 72g which accepts the click ball 81, the pressing piece 82 and the spring 83, a projection 72f for limiting the movement of the supporting body 72 in the arrow D2 direction forming the closing direction, and pressing plate fitting screw holes 72h.

Each of the shaft holes 72c is an insertion hole made in a front section of the supporting body 72 along a horizontal direction on a plane perpendicular to the photographing lens optical axis O. Further, the projecting portions 72d are fitted in the guide grooves 91a of the front cover outer circumferential bottom section to be slidable, thus supporting the supporting body 72 to allow it to be slidable. Still further, the projection 72e is fitted in the guide groove 91b of the front cover outer circumferential side section to be slidable for the purpose of preventing the blast or influence of the supporting body 72 at its sliding operation. Further, the projection 72f can come into contact with a projection 91c (see FIGS. 21, 25A and 25B) formed on an outer circumferential lower section of the front cover 91 and serves as a stopper for preventing the supporting body 72 from coming off of the front cover 91. The front cover 91 side projection 91c is made to be deformable elastically, and can also be a member to be fitted through a screw(s) or the like.

The lens cover 71 has, at its proximal section, a shaft hole 71a which rotatably accommodates the supporting shaft 73, and the supporting shaft 73 is inserted into the shaft hole 71a of the lens cover 71 in a state where a torsion spring 74 is put therein, and is fixed in the shaft holes 72c made in the front end portion of the supporting body 72. Accordingly, the lens cover 71 is rotatably supported by the supporting body 72 in a state of being biased by the torsion spring 74 in the photographing lens closing direction.

In fitting the lens cover 71 and the lens cover supporting section 80 to the front cover 91, first, the pressing spring 83, the pressing piece 82 and the click ball 81 are put in the recess portion 72g of the supporting body 72, and are pressed by the pressing plate 84 and then fixed by the screws 85. Subsequently, the supporting shaft 73 is inserted into the shaft holes of the lens cover 71 and the supporting body 72 in a state where the torsion spring 71 is put therein so that the lens cover 71 is rotatably set to the lens cover supporting section 80. In this state, the projecting portions 72d of the supporting body 72 are put in and inserted into the guide grooves 91a of the front cover 91. At that insertion, the projection 91c of the front cover 91 is elastically deformed by the projection 72f of the supporting body 72 so that the projection 72f runs over the projection 91c, thereby reaching the mounted condition (see FIGS. 23, 25A and 25B).

Although the lens filter 93 can be mounted even in a state where the lens cover 71 is opened after the aforesaid assembly, a description will first be made of the lens cover opening and closing operations in a state where the lens filter 93 is not mounted.

As shown in FIGS. 19, 23, 25A and 25B, in the lens cover closing condition, the lens cover 71 is biased clockwise by the torsion spring 74 to be at the closing position P71A to cover the front surface of the photographing lens 92 in the lens barrel frame 92a. In this state, the lens cover supporting section 80 is at the position P72A and the click ball 81 is fitted in the click groove 91e, and as shown in FIG. 25B, an upward force F0 acts on the click ball 81 through the pressing piece 82 pressed by the spring 83. Accordingly, owing to this force F0, the lens cover supporting section 80 is held at the aforesaid closing position P71A by a given click force.

Thus, for setting the camera 90 into the photographing condition, the operating section 72a of the lens cover supporting section 80 is operated to be slided in the D1 direction. With this operation, the supporting shaft 3 portion is moved toward a location which is under the front cover 91 so that the lens cover 71 rotates counterclockwise in FIG. 23 against the biasing force of the torsion spring 74 to turn over to the opening position P71B at which the photographing lens 92 comes into the open condition. In this condition, the lens cover supporting section 80 is at the position P72B and the click ball 81 is in the click groove 91f so that the lens cover 71 is kept at the opening position P71B by a given click force (see FIGS. 25A and 25B).

For again bringing the lens cover 71 into the closing condition, the lens cover supporting section 80 is shifted in the D2 direction to make the click ball 81 fit in the click groove 91e, and therefore, the lens cover 71 rotates clockwise by the biasing force of the torsion spring 74 up to the closing position P71A, thus assuming the closing condition.

Secondly, a description will be made hereinbelow of the case that the lens filter 93 is mounted on the camera 90. The lens cover 71 is set into the opening condition and the lens filter 93 is mounted on the front surface of the lens barrel frame 92a. In order to set the lens cover 71 into the closing condition, the lens cover supporting section 80 is shifted in the D2 direction so that the ball 81 is fitted in the front side click groove 91d as shown in FIG. 26. In this state, the lens cover 71 travels forwardly by a distance corresponding to the thickness of the lens filter 93, and the lens cover supporting section 72 is at the lens filter closing position P72A'. Accordingly, the lens cover 71 is biased clockwise to reach the filter closing position P71A' at which it closes the lens filter 93. Besides, the opening operation for the lens cover 71 is the same as in the case of no installation of the lens filter 93 mentioned above.

As described above, in the camera 90 according to this embodiment, in the non-photographing condition, the lens cover 71 is at the opening position P71A to intercept the light beam to be incident on the photographing lens 92, and it is possible to certainly protect the lens surface. In addition, in the way of only adding the click groove 91d at the forward position of the lower portion of the camera front cover 91, the lens filter 93 and the photographing lens section become closable by the lens cover 71 even in the case that the lens filter 93 is mounted on the lens barrel frame 92.

That is, in the above-described lens cover mounted camera according to the eighth embodiment, since a supporting member for supporting a lens cover can be held by a fixing means at a given or predetermined position with respect to an outer circumferential surface of a photographing lens barrel, a front surface of the photographing lens barrel is surely openable and closable. In addition, the fixing means is made up of a ball, a locking groove and a biasing means, and therefore, it is possible to hold the supporting member for supporting the lens cover at each of a plurality of given positions.

Although, in the lens cover supporting construction of the camera according to the above-described embodiment, the click ball 81 and the biasing member therefor are located on the supporting body 72 side and the click grooves 91d, 91e, 91f are situated on the front cover 91 side, the opposite arrangement is also acceptable, and even if the click ball and the biasing member therefor are located on the front cover 91 side and the click grooves are situated on the supporting body side, the same effects are obtainable.

What is claimed is:

1. A camera comprising:
   a lens barrel for a photographing lens;
   a lens cover rotatable supported upon a supporting shaft mounted external to said lens barrel, said lens cover being rotatable to selectively take at least a closing condition to cover a front surface of a photographing lens and an opening condition to expose the front surface of said photographing lens; and a slide mechanism for supporting said lens cover through said supporting shaft to allow said lens cover to be movable along an optical axis of said photographing lens with respect to said lens barrel in a state where the lens cover is in said opening condition.

2. A camera according to claim 1 wherein said supporting shaft is arranged perpendicular to said optical axis.

3. A camera comprising:

a lens cover rotatably supported by a supporting shaft placed in parallel with a plane substantially perpendicular to an optical axis of a photographing lens so that said lens cover selectively takes, by its rotation, at least a closing condition to cover a front surface of said photographing lens and an opening condition to expose the front surface of said photographing lens; and moving means for allowing said supporting shaft to be movable in a direction substantially parallel to an optical axis of said photographing lens when said lens cover is rotated around said supporting shaft.

4. A camera comprising:

a lens cover rotatably supported by a supporting shaft placed in parallel with a plane substantially perpendicular to an optical axis of a photographing lens so that said lens cover selectively takes, by its rotation, at least a closing position at which said lens cover covers a front surface of said photographing lens and an opening position at which said lens cover exposes the front surface of said photographing lens; and a lens cover operating member for holding said supporting shaft to selectively move said supporting shaft in a first direction and a second direction opposite to said first direction along directions substantially parallel to an optical axis of said photographing lens, wherein said lens cover shifts from said closing position to said opening position in a manner that said supporting shaft is moved in said first direction by said lens cover operating member, and further, shifts from said opening position to said closing position in a manner that said supporting shaft is moved in said second direction by said lens cover operating member.

5. A camera as defined in claim 4, further comprising a switch member made to operate in connection with the movement of said lens cover driving member.

6. A camera as defined in claim 5, wherein said switch member turns on when said lens cover driving member shifts from a first position to a second position while turning off when said lens cover driving member shifts from said second position to said first position.

7. A camera as defined in claim 1 or 3 or 4, further comprising a switch member made to operate in connection with the movement of said lens cover.

8. A camera as defined in claim 7, wherein said switch member turns on when said lens cover shifts from said closing position to said opening position while turning off when said lens cover shifts from said opening position to said closing position.

9. A camera as defined in claim 5 or 7, wherein said switch member is a switch for turning on and off a power supply to said camera.

10. A camera comprising:

a lens cover rotatable around a supporting shaft placed in parallel with a plane substantially perpendicular to an optical axis of a photographing lens to selectively take at least a closing position at which said lens cover covers a front surface of said photographing lens and an opening position at which said lens cover exposes the front surface of said photographing lens; and a lens cover operating member for holding said supporting shaft, said lens cover operating member being provided to be movable along directions of an optical axis of said photographing lens, wherein said lens cover shifts to said closing position and said opening position in conjunction with the movement of said lens cover operating member.

11. A camera as defined in claim 10, further comprising a supporting mechanism for supporting said lens cover operating member in an engaging condition so that said lens cover operating member is slidable along said optical axis directions.

12. A camera as defined in claim 11, wherein said supporting mechanism includes a groove section, and a projecting section provided in said lens cover operating member and a mating member engaging said lens cover operating member, with one of said groove section and said projecting section fitted in said groove section being provided in said lens cover operating member while the other being provided in said mating member.

13. A camera comprising:

a photographing lens barrel including a photographing lens;

a lens cover rotatable around a supporting shaft placed in parallel with a plane substantially perpendicular to an optical axis of a photographing lens to perform a door-like opening and closing movement to selectively assume at least a closing position at which said lens cover covers a front surface of said photographing lens and an opening position at which said lens cover exposes the front surface of said photographing lens;

a biasing member for rotationally biasing said lens cover in a direction of said closing position around said supporting shaft; and supporting shaft moving means for holding said supporting shaft and for supporting said supporting shaft to allow said supporting shaft to be movable along a direction of said optical axis of said photographing lens, wherein said lens cover shifts to said closing position and to said opening position in conjunction with the movement of said supporting shaft by said supporting shaft moving means.

14. A camera as defined in claim 13, wherein said supporting shaft is positioned on a front side of an armoring member covering an outer circumference of said photographing lens barrel and outside an outer circumference of said photographing lens barrel or said armoring member when said lens cover is at said closing position.

15. A camera as defined in claim 13, further comprising:

an armoring member for covering an outer circumference of said photographing lens barrel; and a contacting section placed on said lens cover to come into contact with said photographing lens barrel or said armoring member, wherein said lens cover is rotated to shift to said closing position and to said opening position due to a force working on said supporting shaft and said contacting section in connection with the movement of said supporting shaft by said supporting shaft moving means.

16. A camera as defined in claim 15, wherein, when said lens cover is at said opening position, said contacting section is a side surface portion of an outer circumference of said photographing lens barrel or said armoring member so that said lens cover is maintained in a fully open condition.

17. A camera as defined in claim 16, wherein, when said lens cover is in said fully opening condition, a protruding quantity of said lens cover from a tip portion of said photographing lens barrel in said optical axis direction is set to be smaller than a radius dimension of said photographing lens barrel.

18. A camera as defined in claim 16, wherein, when said lens cover is in said fully opening condition, said lens cover is made to be further rotatable in the same direction from said closing position to said opening position in a manner that said contacting section is separated from said side surface portion of said outer circumference of said armoring member.

19. A camera comprising:
   a photographing lens barrel including a photographing lens;
   a lens cover selectively assuming at least a closing position at which said lens cover covers a front surface of said photographing lens and an opening position at which said lens cover exposes the front surface of said photographing lens;
   a lens cover driving member placed along directions of an optical axis of said photographing lens and serving as a lens cover operating member for driving said lens cover so that said lens cover takes opening and closing positions;
   a bent section formed in parallel with a plane substantially perpendicular to said optical axis of said photographing lens for connecting said lens cover to said lens cover driving member, and serving as a supporting section for allowing said lens cover to be rotatable in a door-like way;
   biasing means for rotationally biasing said lens cover in its closing direction around said bent section; and
   a bent section moving mechanism for allowing said bent section to be movable in said directions of said optical axis of said photographing lens in connection with the movement of said lens cover driving member along said optical axis directions,
   wherein said lens cover shifts to said closing position and to said opening position by said lens cover driving member in conjunction with a rotational movement of said bent section in said photographing lens optical axis directions.

20. A camera as defined in claim 19, wherein said lens cover driving member is disposed at a lower portion of said camera.

21. A camera comprising:
   a supporting shaft placed in parallel with a plane substantially perpendicular to an optical axis of a photographing lens; and
   a lens cover supported by said supporting shaft to be rotatable to selectively assumes at least a closing position at which said lens cover covers a front surface of said photographing lens and an opening position at which said lens cover makes said front surface thereof appear;
   wherein said lens cover comprises at least two sections one of which is divisionally disengaged from the other with respect to a division line parallel with said supporting shaft when a force is applied to said lens cover in a direction of further opening said lens cover while said lens cover is at said opening position.

22. A camera as defined in claim 21, further comprising a division line section provided to extend in substantial parallel with said supporting shaft between a proximal section of said lens cover rotatably supported by said supporting shaft and a tip section of said lens cover remote from said proximal section, with the disengagement between said two sections being made along said division line section.

23. A camera as defined in claim 21, further comprising locking means for establishing a locking condition between said two sections of said lens cover to be divisionally disengaged from each other.

24. A camera as defined in claim 21, further comprising an elastic connecting member provided between said two sections of said lens cover to be divisionally disengaged from each other to connect said two sections.

25. A camera comprising:
   a first supporting shaft placed to extend in parallel with a plane substantially perpendicular to an optical axis of a photographing lens;
   a lens cover supported by said first supporting shaft to be rotatable to selectively take at least a closing position at which said lens cover covers a front surface of said photographing lens and an opening position at which said lens cover exposes said front surface thereof; and
   a second supporting shaft provided between a proximal section of said lens cover rotatably supported by said first supporting shaft and a top section of said lens cover remote from said proximal section to extend in substantial parallel with said first supporting shaft,
   wherein, when a force is applied to said top section of said lens cover in a photographing lens opening direction while said lens cover is at said opening position, said top section of said lens cover is further rotated in said opening direction around said second supporting shaft.

26. A camera as defined in claim 25, further comprising a click stop mechanism provided between said top section of said lens cover and said proximal section thereof, with said top section thereof being locked with said click stop mechanism to stop its rotation around said second supporting shaft.

27. A camera as defined in claim 26, further comprising an elastic connecting member provided between said top section and said proximal section to provide a connection therebetween.

28. A camera as defined in claim 24 or 27, wherein said connecting member is constructed with one of a metallic spring material, a synthetic resin material and a rubber material.

29. A camera comprising:
   a supporting shaft placed in a vicinity of an outer circumferential surface of a photographing lens barrel to extend along a substantially tangential line to said outer circumferential surface;
   a lens cover rotatably supported by said supporting shaft, and rotationally movable around said supporting shaft to selectively move at least between a closing position at which said lens cover covers a front surface of said photographing lens barrel and an opening position at which said lens cover exposes the front surface of said photographing lens barrel;
   a supporting member for supporting said supporting shaft to allow said supporting shaft to be movable along directions of an optical axis of a photographing lens; and
   holding means for holding the movably supported supporting member at each of a plurality of positions in said optical axis directions.

30. A camera as defined in claim 29, wherein, at least when a lens filter is mounted on a front surface of said photographing lens, said holding means is made to hold said supporting member at a predetermined position in said optical axis directions with respect to said lens filter.

31. A camera as defined in claim 29, wherein said holding means holds said supporting member at each of said lens cover opening position, said lens cover closing position and a position corresponding to a mounting condition of a lens filter.

32. A camera as defined in claim 29, wherein said holding means is composed of a ball, a locking groove engaging with said ball and biasing means for biasing said ball toward said locking groove.

33. A camera as defined in claim 32, wherein said locking groove is made in a camera body for supporting said supporting member movably in said optical axis directions.

34. A camera as defined in claim 29, wherein said lens cover receives a biasing force in a direction of closing said front surface of said photographing lens barrel.

35. A camera as defined in claim 34, wherein, when said supporting member moves forwardly with respect to said photographing lens barrel, said lens cover closes said front surface of said photographing lens barrel, and when said supporting member moves rearwardly with respect to said photographing lens barrel, said lens cover exposes said front surface of said photographing lens barrel.

* * * * *

UNITED STATES PATENT AND TRADEMARK OFFICE
CERTIFICATE OF CORRECTION

PATENT NO : 6,033,130
DATED : March 7, 2000
INVENTOR(S) : Muroi et al.

It is certified that error appears in the above-identified patent and that said Letters Patent are hereby corrected as shown below:

At column 16, line 31, after the word "both", delete "tie" and insert therefor --lie--.

Signed and Sealed this

First Day of May, 2001

Attest:

NICHOLAS P. GODICI

*Attesting Officer*     *Acting Director of the United States Patent and Trademark Office*